(12) United States Patent
Ikuyama et al.

(10) Patent No.: US 6,389,234 B1
(45) Date of Patent: May 14, 2002

(54) CAMERA INCORPORATING A FOCAL-PLANE SHUTTER

(75) Inventors: Jun Ikuyama; Taku Wagatsuma, both of Hachioji (JP)

(73) Assignee: Konica Corporation, Tokyo (JP)

( * ) Notice: Subject to any disclaimer, the term of this patent is extended or adjusted under 35 U.S.C. 154(b) by 84 days.

(21) Appl. No.: 09/611,265

(22) Filed: Jul. 6, 2000

(30) Foreign Application Priority Data

Jul. 7, 1999 (JP) ............................................. 11-193737

(51) Int. Cl.$^7$ .......................... G03B 7/08; G03B 17/24; G03B 15/05
(52) U.S. Cl. ...................... 396/195; 396/273; 396/274; 396/296; 396/315; 396/452; 396/535
(58) Field of Search ................................ 396/273, 274, 396/296, 315–318, 195, 443, 401, 452, 535, 541

(56) References Cited

U.S. PATENT DOCUMENTS 4,392,728 A * 7/1983 Yoshida ....................... 396/273
4,400,073 A * 8/1983 Tosaka et al. ............... 396/401
5,337,108 A * 8/1994 Kaihara et al. ............. 396/318
6,314,245 B1 * 11/2001 Tanaka ........................ 396/315

* cited by examiner

Primary Examiner—W. B. Perkey
(74) Attorney, Agent, or Firm—Finnegan, Henderson, Farabow, Garrett & Dunner, L.L.P.

(57) ABSTRACT

There is described a camera incorporating a focal-plane shutter. The camera includes a lens, an image window having an aperture to bound a light coming through the lens in a plain perpendicular to an optical axis of the lens, a focal-plane shutter and a photometry sensor to receive the light reflected by the focal-plain shutter and detect an amount of the light reflected by the focal-plane shutter after coming through the lens. In the camera, the photometry sensor is located at an outside of the aperture and resides on a plane, which is parallel with the optical axis and includes a line which is parallel to a long-axis of the aperture and passes substantially a center of a short-axis of the aperture.

12 Claims, 30 Drawing Sheets

CAMERA INCORPORATING A FOCAL-PLANE SHUTTER

BACKGROUND OF THE INVENTION

The present invention relates to a camera incorporating a focal-plane shutter.

In certain conventional cameras, the photometry is achieved by measuring a light intensity reflected from the focal-plane shutter, using the photometry means. For instance, as shown in FIG. 30(a), photometry means 1000 is disposed at substantially the lower center position of image window 1001, or at the upper corner position of image window 1001 as shown in FIG. 30(b).

Accordingly, the photometric region measured by the above photometry means is limited in an elliptical region covered by the aperture of the photometry means disposed at either the lower center position or the upper corner position. Therefore, the efficiency of the photometry means decreases at a rate of uncovered region in the image window, since the major axis of the elliptical region does not coincide with the longer axis of the image window.

Further, since the focal-plane shutter, incorporated in the above conventional cameras, is not integrally mounted with the photometry means and the dating means, the positioning process of the photometry means and the dating means relative to the image window should be performed after combining them with the image window. Therefore, readjustment of the photometry means and the dating means is necessary, after reassembling them into the camera, for instance, at the time of maintenance works.

In addition, in the above conventional cameras, error occurrences of the focal-plane shutter cannot be detected.

SUMMARY OF THE INVENTION

To overcome the abovementioned drawbacks in conventional cameras, the first object of the present invention is to provide a camera which makes it possible to perform a precise photometry, and the second object of the present invention is to provide a camera in which an assembling process is simplified and improved, the third object of the present invention is to provide a camera which makes it possible to detect an error of the focal-plane shutter.

Accordingly, to overcome the cited shortcomings, the abovementioned objects of the present invention can be attained by cameras described as follow.

(1) A camera, comprising a lens, an image window having an aperture to bound a light coming through the lens in a plain perpendicular to an optical axis of the lens, a focal-plane shutter and a photometry sensor to receive the light reflected by the focal-plane shutter and detect an amount of the light reflected by the focal-plane shutter after coming through the lens, wherein the photometry sensor is located at an outside of the aperture and resides on a plane, which is parallel with the optical axis and includes a line which is parallel to a long-axis of the aperture and passes substantially a center of a short-axis of the aperture.

(2) The camera of item 1, wherein the photometry sensor is located outside a light path through which the light, entering from the lens, travels to the aperture.

(3) The camera of item 1, further comprising a photometry aperture control to set a photometry range, the photometry aperture control is disposed in an optical path through which the light, reflected by the focal-plane shutter, travels to the photometry sensor.

(4) The camera of item 3, further comprising a finder and a photometry range display, disposed in the finder, to display the photometry range set by the photometry aperture control.

(5) The camera of item 1, further comprising a processor to obtain parameters in regard to an exposure control, based on an amount of the light detected by the photometry sensor.

(6) The camera of item 1, wherein the photometry sensor is integrally arranged in a shutter unit which comprises the focal-plane shutter.

(7) The camera of item 1, further comprising a date projector to project a date on a film loaded in the camera, the date projector is integrally arranged in a shutter unit which comprises the focal-plane shutter.

(8) The camera of item 1, further comprising a X-switch signal sensor to detect a signal of a X-switch mounted in the focal-plane shutter and a controller to perform error jobs, when the X-switch signal sensor does not detect the signal within a predetermined time after activating a shutter release button.

(9) A camera, comprising a lens, a shutter unit comprising a focal-plane shutter and a photometry sensor to receive and detect an amount of a light reflected by the focal-plane shutter after coming through the lens, the photometry sensor is integrally arranged in the shutter unit.

(10) A camera, comprising a lens, a shutter unit comprising a focal-plane shutter and a date projector to project a date on a film loaded in the camera, the date projector is integrally arranged in the shutter unit.

(11) A camera, comprising a lens, a focal-plane shutter, a X-switch signal sensor to detect a signal of a X-switch and a controller to perform error jobs, when the X-switch signal sensor does not detect the signal within a predetermined time after activating a shutter release button.

Further, to overcome the abovementioned problems, other cameras, embodied in the present invention, will be described as follow:

(12) A camera, characterized in that said camera performs a photometry by means of a photometry means which receives a light coming through the lens and reflected by the focal-plane shutter, and the photometry means is arranged at substantially a center side position of a short-axis of the aperture, viewing from a photographic lens side.

According to the camera described in item 12, the photometry efficiency can be improved by arranging the photometry means at substantially a center side position of a short-axis of the aperture, viewing from a photographic lens side, and by aligning a photometry region in a direction of the aperture.

(13) The camera of item 12, characterized in that the camera further comprises a photometry aperture means to set a photometry range, and the photometry aperture means is disposed in an optical path through which the light, reflected by the focal-plane shutter, travels to the photometry means.

According to the camera described in item 13, since a variable photometry can be achieved by varying the photometric region in an optical path, through which the light, reflected by the focal-plane shutter, enters into photometry means, it becomes possible for a photographer to select a suitable photometric region corresponding to the scene to be shot.

(14) The camera of item 13, characterized in that the camera further comprises a photometry range display means, disposed in a finder, to display the photometry range set by the photometry aperture means.

According to the camera described in item 14, since the photometric region is displayed on the photometric region display means disposed in the finder, it becomes possible for the photographer to easily select the desirable photometric region.

(15) A camera, characterized in that said camera performs a photometry by means of a photometry means which receives a light coming through a photographic lens and reflected by a focal-plane shutter, and a photometry means is integrally arranged in a focal-plane shutter unit which comprises the focal-plane shutter.

According to the camera described in item 15, since the photometry means is integrally assembled with the focal-plane shutter unit, it is possible to adjust the relative position between the focal-plane shutter and the photometry means in a state of unit. Therefore, it becomes possible to detect failed units and to precisely assemble the units before assembling the focal-plane shutter unit in the camera body.

(16) A camera, characterized in that said camera performs a photometry by means of a photometry means which receives a light coming through a photographic lens and reflected by a focal-plane shutter, and a dating means is integrally arranged in a focal-plane shutter unit which comprises the focal-plane shutter.

According to the camera described in item 16, since the dating means is integrally assembled with the focal-plane shutter unit, it is possible to adjust the relative position between the focal-plane shutter and the dating means in a state of unit. Therefore, the readjustment of the relative position between them is not necessarily when performing maintenance works.

(17) A camera, characterized in that said camera comprises a focal-plane shutter, a X-switch signal detecting means to detect a signal of a X-switch and a control means to perform error jobs, when the X-switch signal detecting means does not detect the signal of the X-switch within a predetermined time after activating a shutter release button.

According to the camera described in item 17, in regard to the camera in which the X switch turns ON only when the succeeding shutter blind completely running through the aperture, it is possible to detect an error state caused by a certain malfunction, when the X switch does not turns ON within the predetermined time after the succeeding blind starts running. Thus, the photographer can easily perceive the error state of the camera, even when an image capturing becomes impossible due to a certain malfunction in the focal-plane shutter.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

In the following, a camera, embodied in the present invention, will be described in detail, referring the drawings.

Figure 1:
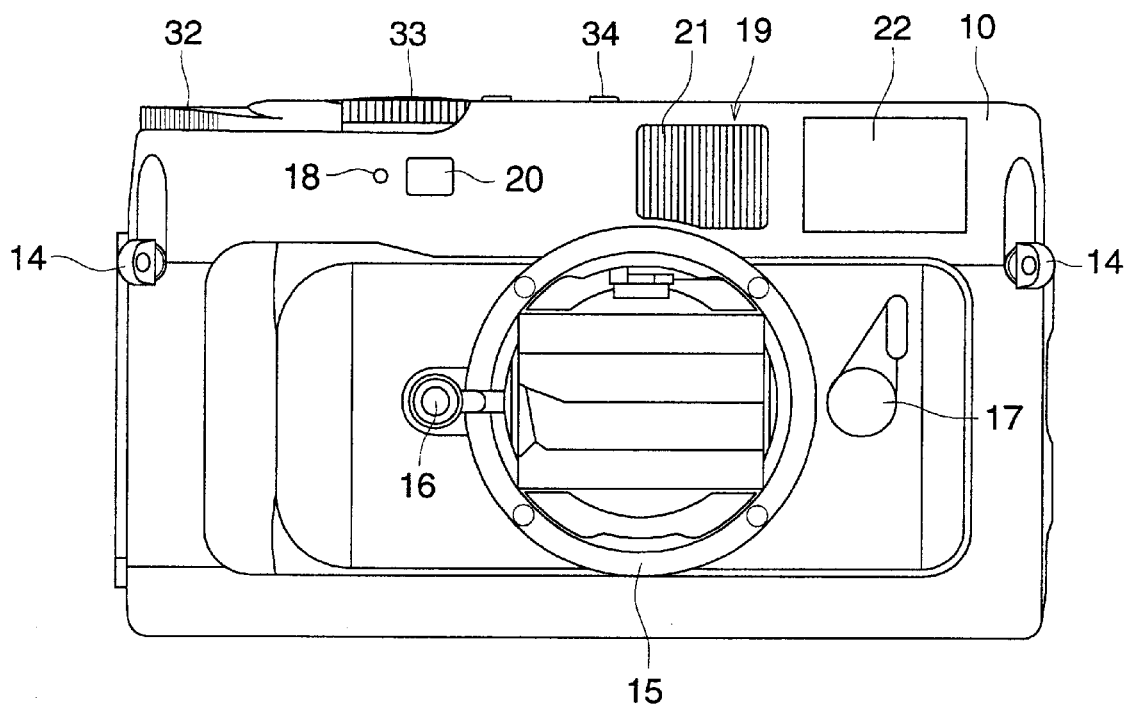
FIG. 1 shows a front view of a camera.
Figure 2:
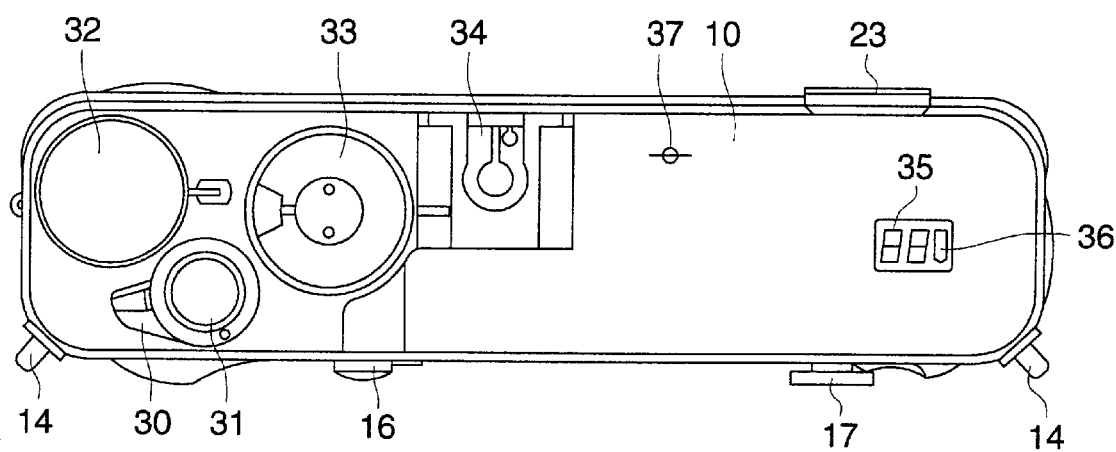
FIG. 2 shows a top view of the camera.
Figure 3:
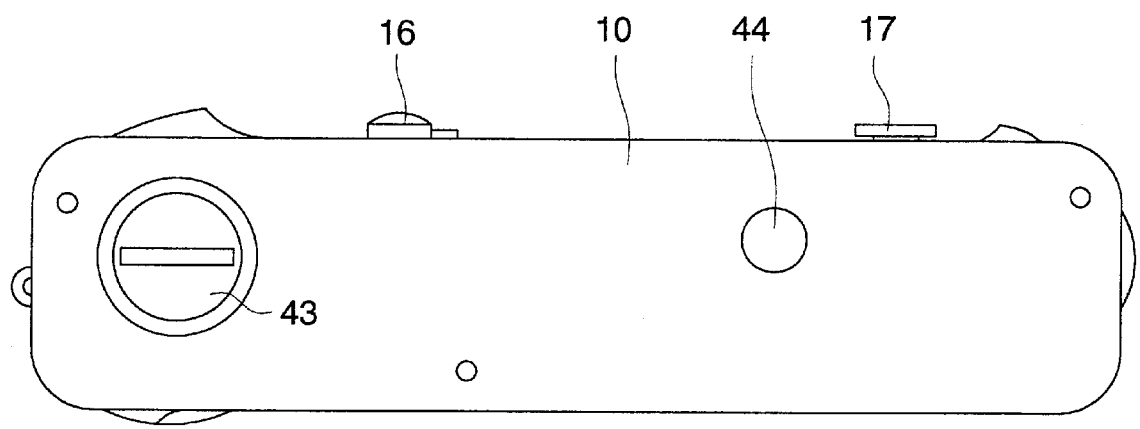
FIG. 3 shows a bottom view of the camera.
Figure 4:
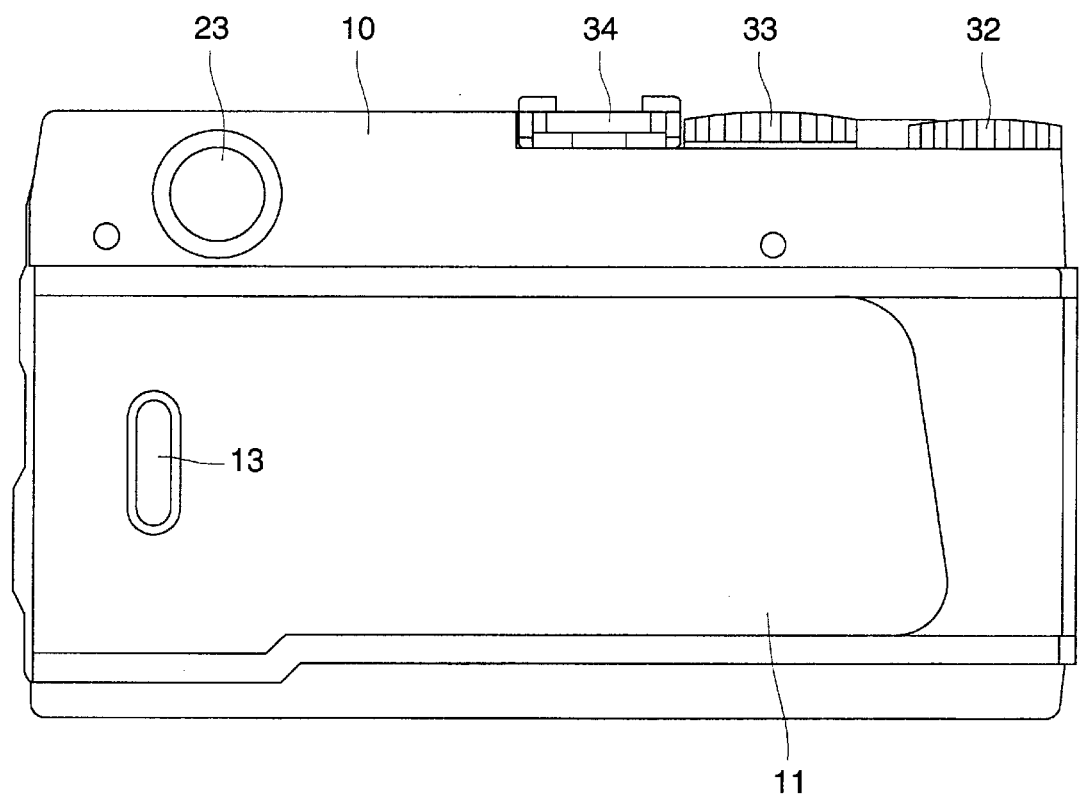
FIG. 4 shows a rear view of the camera.
Figure 5:
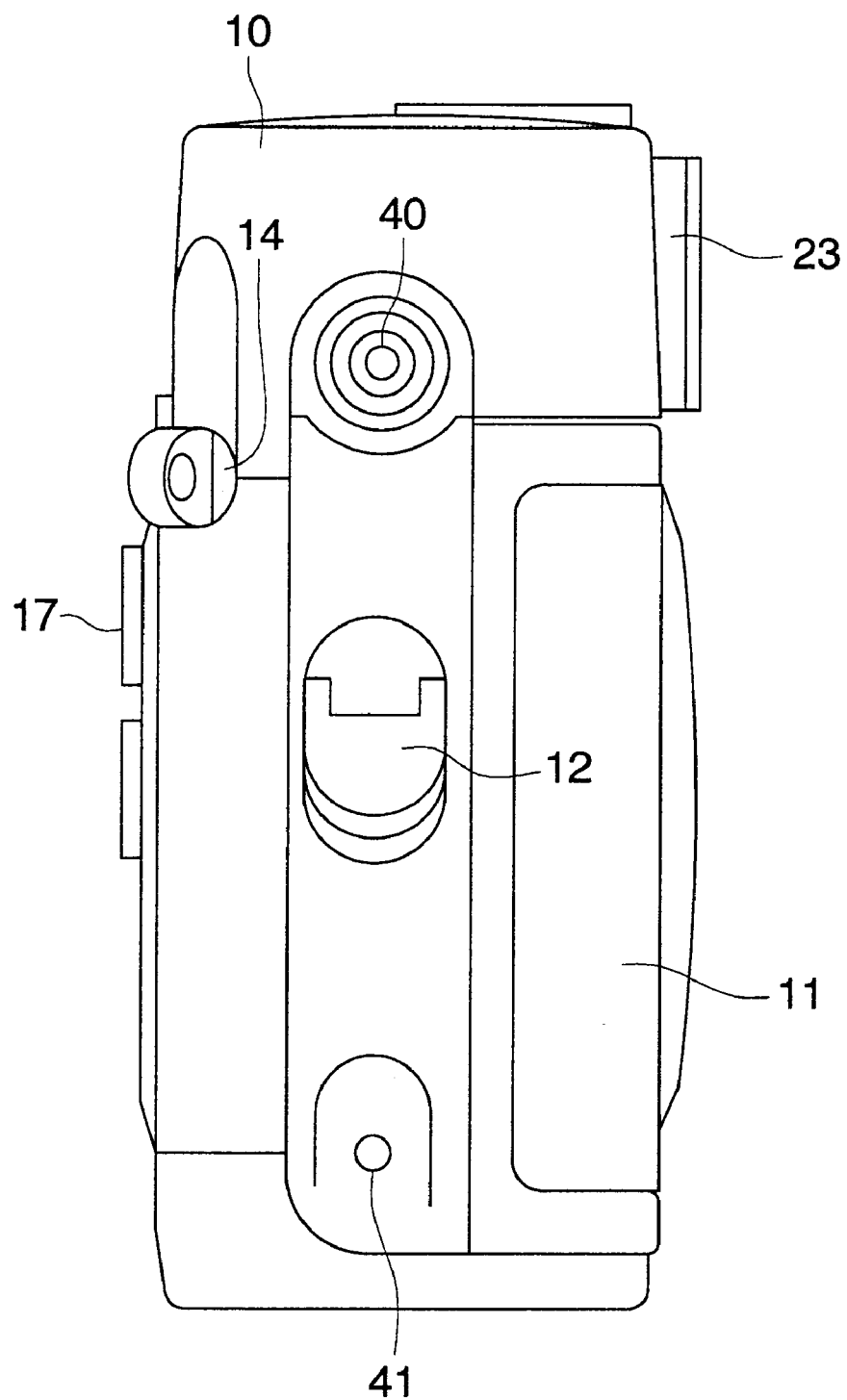
FIG. 5 shows a right-side view of the camera.
Figure 6:
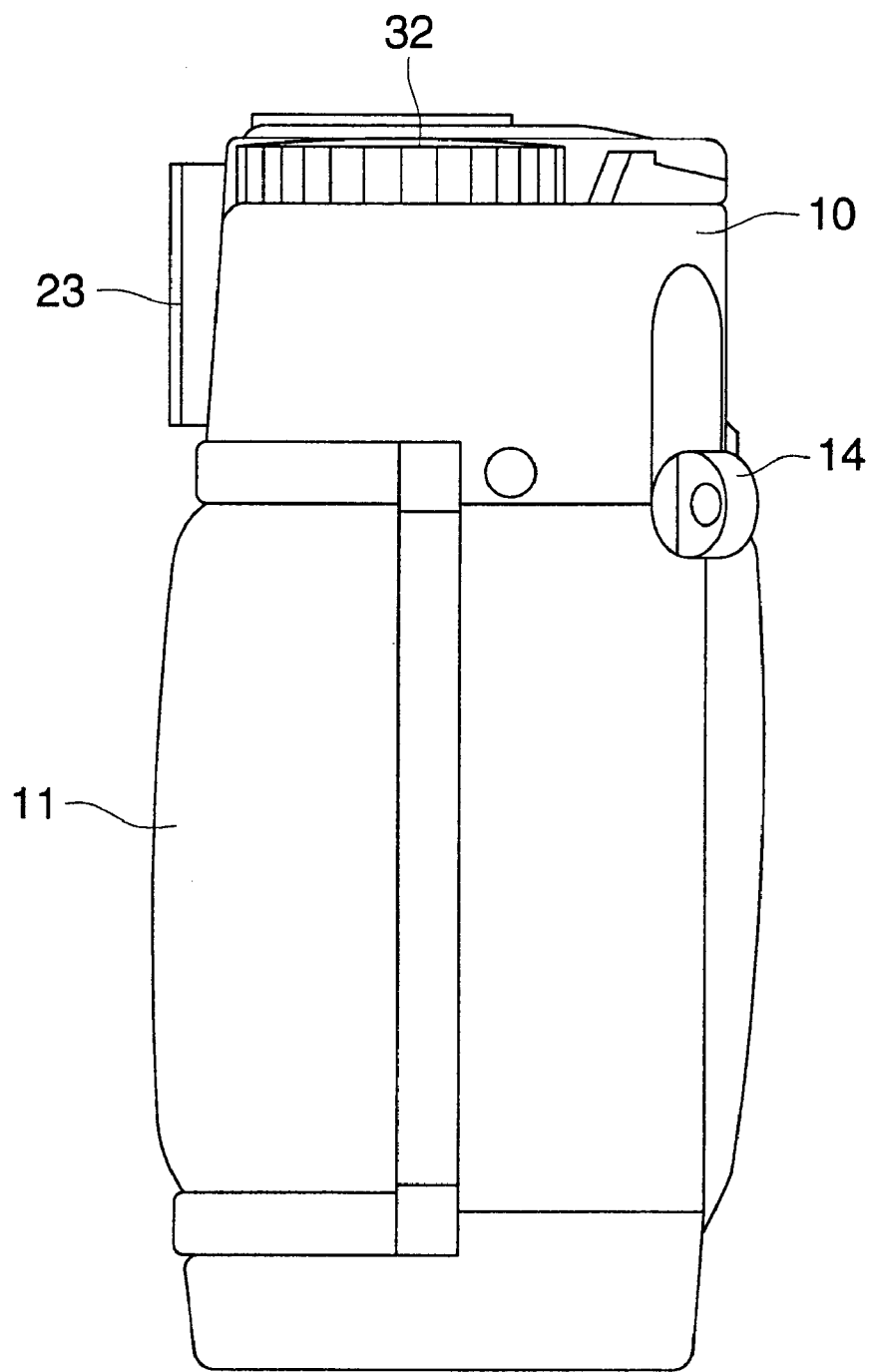
FIG. 6 shows a left-side view of the camera.
Figure 7:
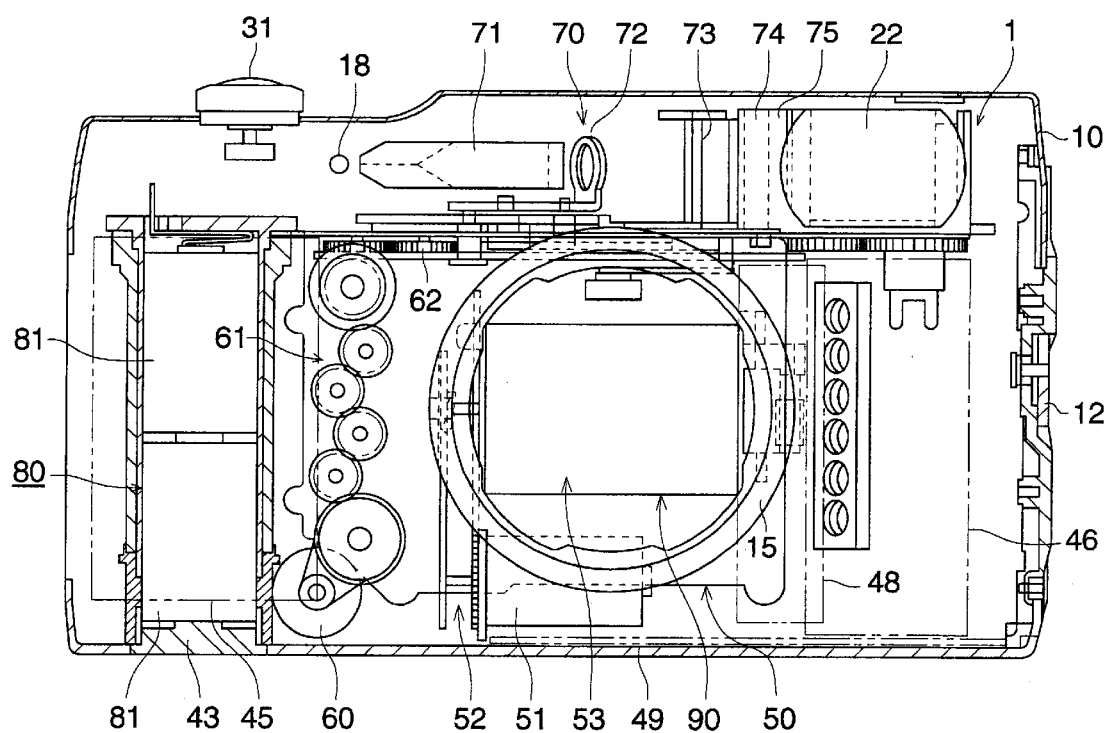
FIG. 7 shows internal structure of the camera, viewing from the front side.
Figure 8:
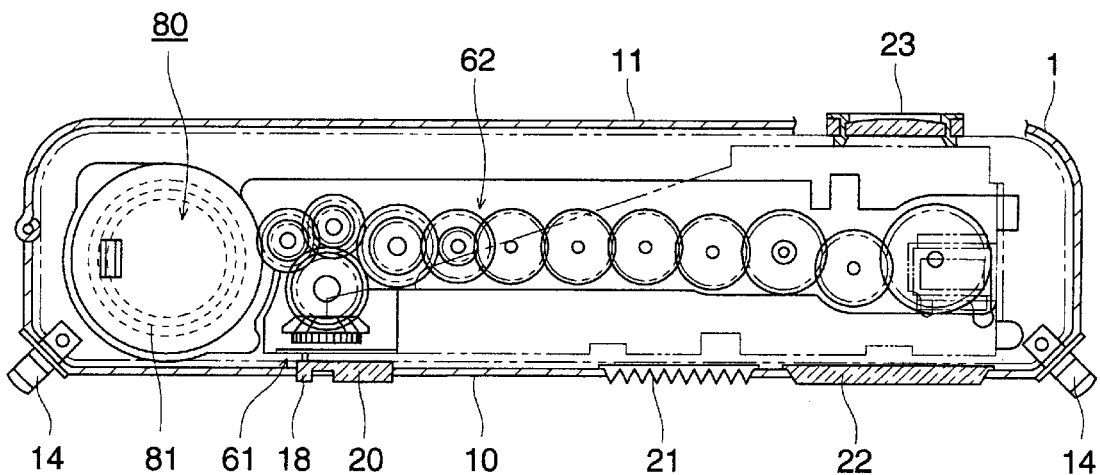
FIG. 8 shows internal structure of the camera, viewing from the topside.

The camera, embodied in the present invention, is illustrated in FIGS. 1 through 8, specifically; FIG. 1 shows a front view of the camera, FIG. 2 shows a top view of the camera, FIG. 3 shows a bottom view of the camera, FIG. 4 shows a rear view of the camera, FIG. 5 shows a right-side view of the camera, FIG. 6 shows a left-side view of the camera, FIG. 7 shows internal structure of the camera, viewing from the front side and FIG. 8 shows internal structure of the camera viewing from the top side.

The camera specifications are indicated as follow.

Type of camera: 35 mm interchangeable lens camera with rangefinder and focal-plane shutter AE method: aperture-priority automatic exposure method and manual shooting is possible Lens mounting method: bayonet mount Finder: inverted Galilean finder with real image rangefinder Rangefinder: split image coincidence type rangefinder Shutter: electronic-controlled vertical focal-plane shutter Shutter speed: 16-1/4000 sec in automatic mode and Bulb B-1/400 sec in manual mode Photometry method: TTL stop-down metering method Film sensitivity setting range: 25–5000 with automatic introduction of the DX code, 6–6400 in manual mode and exposure compensation is possible Film feeding: automatic winding and rewinding, intermediate rewinding is possible and continuous shooting of 2.5 pictures per second at room temperature is possible Now, the camera layout will be detailed in the following.

Metallic camera cover 10 and rear cover 11 enclose camera body 1, to which rear cover 11 is attached, being capable of opening and closing. Rear cover 11 can be opened by lifting up rear cover opening lever 12 and rotate it in a clockwise direction. Film confirming window 13 is opened on the rear cover 11.

Rings 14 for the carrying strap are attached to the both front-sides of camera cover 10 and lens mount 15 is equipped at the center of the camera. Lens detaching button 16 is located near one side of lens mount 15, while lever 17 for switching the finder view frame is located near the other side of lens mount 15. LED window 18 for the self-timer is located at a front-upper portion of camera cover 10, as well as ranging window 20, lighting window 21 and finder window 22. While, viewfinder window 22 is attached to the rear side of camera cover 10.

Main switch lever 30 and release button 31 are equipped on the topside of camera cover 10, as well as shutter dial 32, ISO/exposure compensation dial 33, strobe attaching shoe 34, film counter 35, battery power display 36 and film-position indicator 37.

On the right side of camera cover 10, cable release socket 40 is disposed at the upper position of rear cover opening lever 12 and rewinding button 41 is disposed at the lower position of it. On the bottom side of camera cover 10, battery cover 43 and tripod socket 44 are arranged.

Shutter section 50 is mounted in the center interior of camera cover 10. Film winding room 45, in which the reel winds the exposed film, and patrone housing 46, in which a patrone is stored, are arranged at both side portions of shutter section 50, as shown in FIG. 7. Circuit boards 48, 49 are disposed at the front side of patrone housing 46 and at the lower side of shutter section 50, respectively.

Shutter charging motor 51 is disposed at the lower position of shutter section 50 to drive shutter charging mechanism 52 which charges shutter blind 53 of electronic-controlled vertical focal-plane shutter 90.

Film feeding motor 60 is disposed at the lower side of film winding room 45 to drive vertical gear train 61 arranged in vertical direction. Vertical gear train 61 is further geared with horizontal gear train 62 disposed at the upper side, which rotates the reel and the spool in the patrone to convey the film. Thus, the automatic winding and rewinding, as well as the intermediate rewinding are achieved in the above-mentioned configurations.

Finder section 70 is mounted on the upper position of horizontal gear train 62. Finder section 70 is the inverted Galilean finder with real image rangefinder, comprising prism 71, lens 72, view frame 73, lens 74, etc. Two batteries can be loaded in battery room 80 provided in the interior of film winding room 45.

Next, the configuration of the photometry section will be detailed in the following, referring FIGS. 9 through 12.

In the camera, embodied in the present invention, the photometry is achieved by means of photometry means 91 which receives a light, coming through shooting lends 100 and reflected on focal-plane shutter 90.

Figure 9:
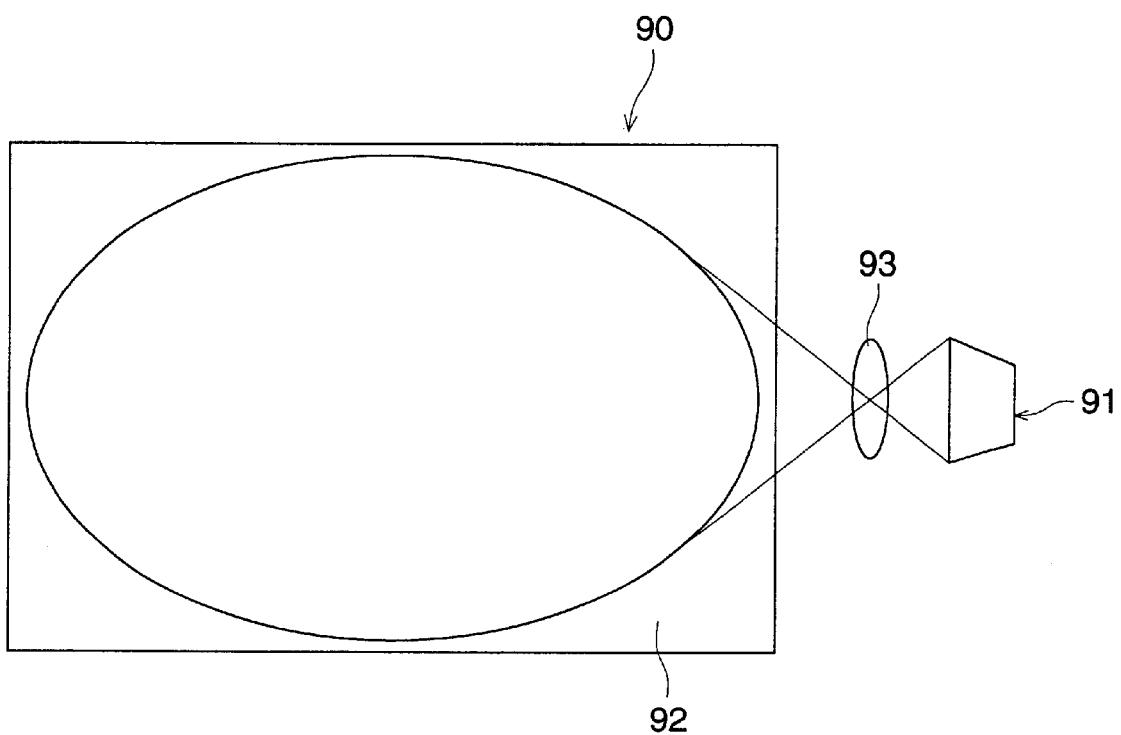
FIG. 9 shows an arrangement of a photometry means.
Figure 10:
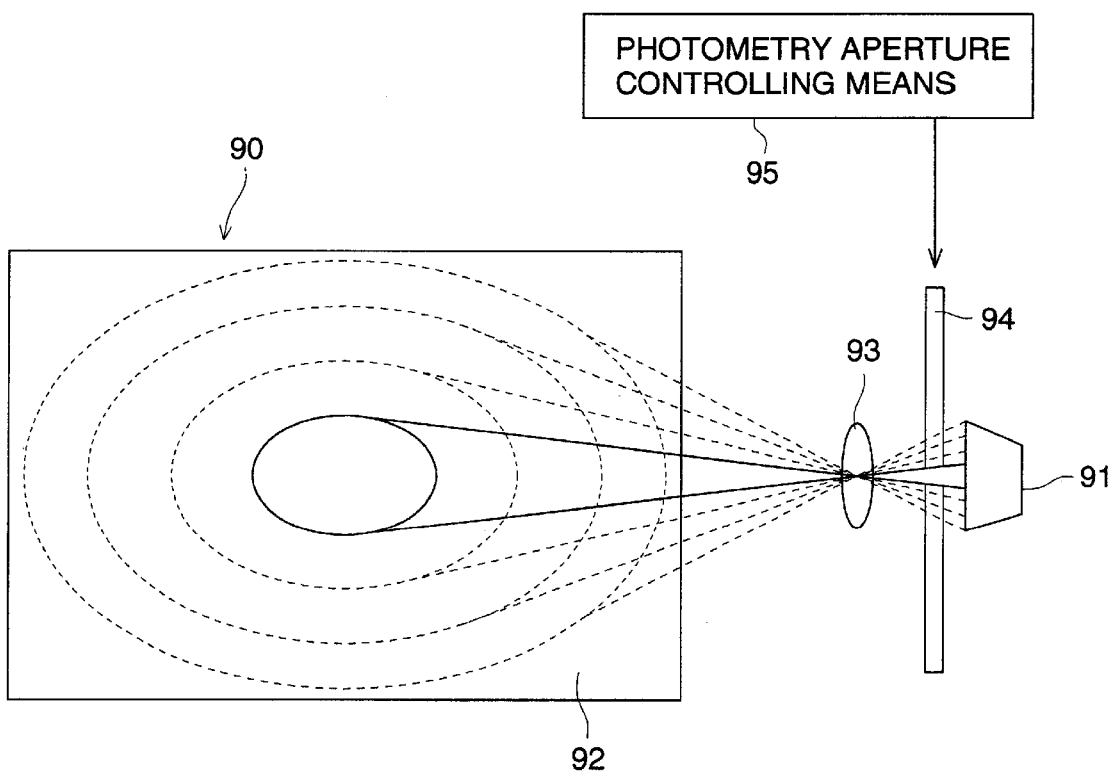
FIG. 10 shows variable photometric regions.
Figure 11:
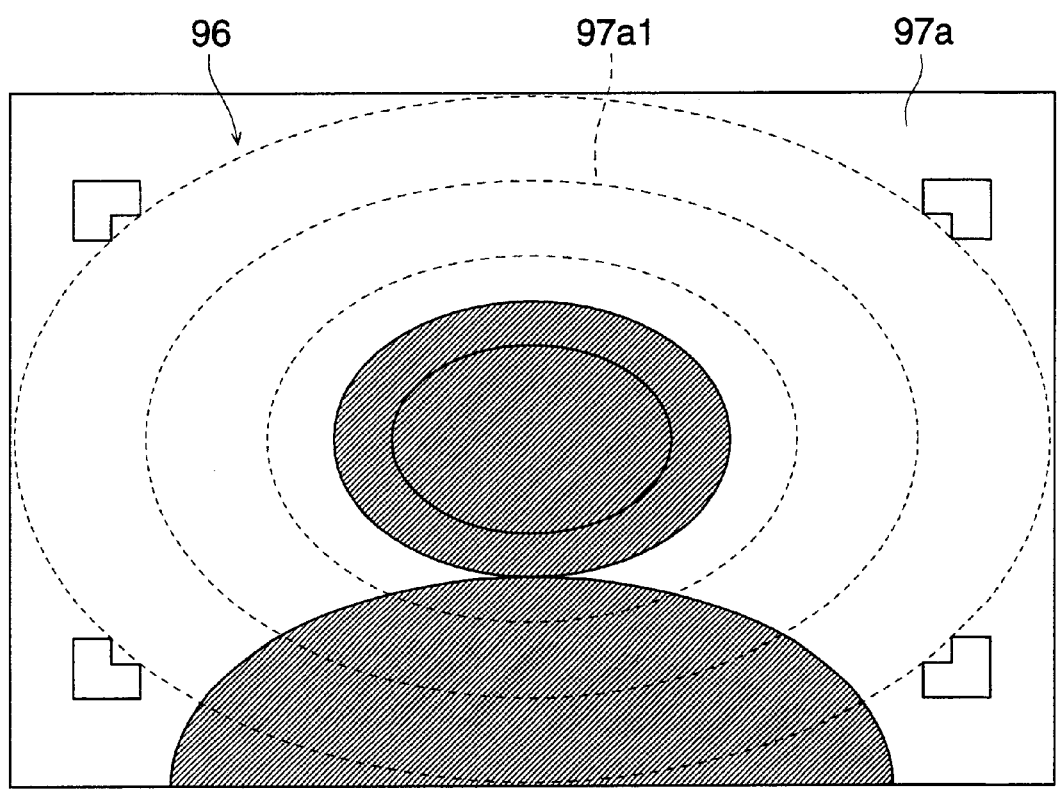
FIG. 11 shows a view displayed in the finder.
Figure 12:
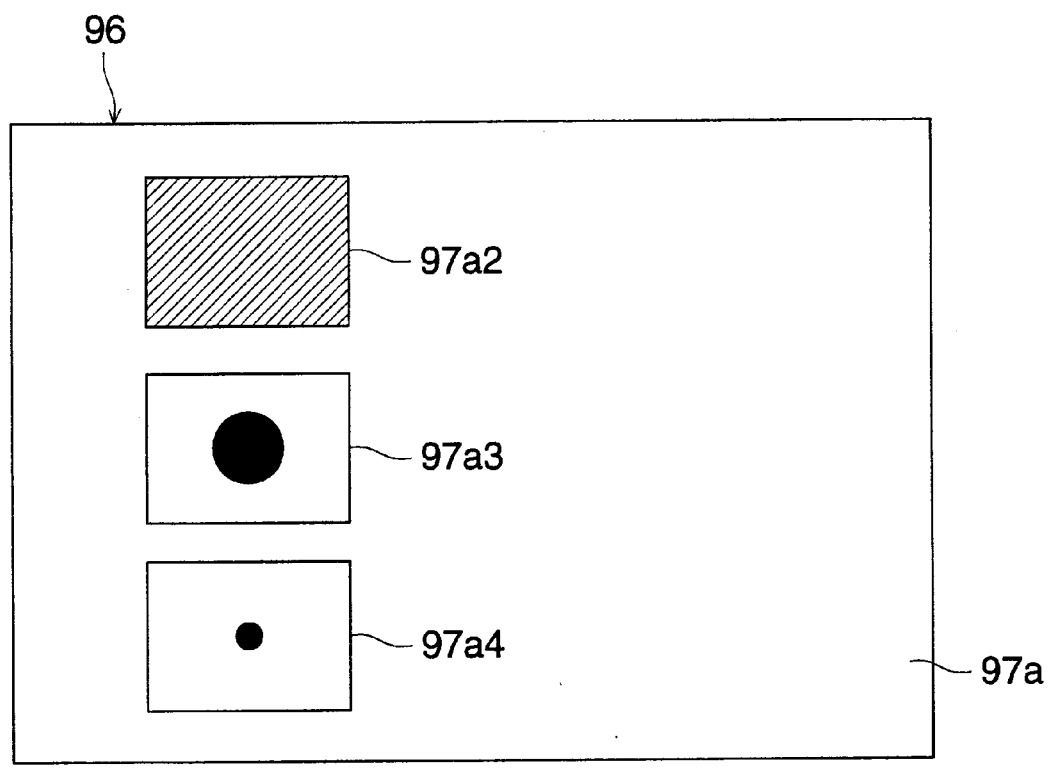
FIG. 12 shows another example of the view displayed in the finder.

FIG. 9 shows an arrangement of the photometry means, FIG. 10 shows variable photometric regions, FIG. 11 shows a view displayed in the finder and FIG. 12 shows another example of the view displayed in the finder.

As shown in FIG. 9, photometry means 91 is arranged at substantially the center side position of the shorter-axis of image window 92, viewing from the shooting lens side. Lens 93 is disposed in an optical path, through which the light reflected by focal-plane shutter 90 incidents on (enters into) photometry means 91. Accordingly, it becomes possible to improve the efficiency of the photometry, since the longer direction of the photometric region coincides with that of image window 92 by arranging photometry means 91 at substantially the center side position of the shorter-axis of image window 92, viewing from the shooting lens side.

Further, as shown in FIG. 10, lens 93 and photometry aperture 94 are disposed midway in optical path, through which the light reflected on focal-plane shutter 90 incidents on (enters into) photometry means 91. Photometry aperture controlling means 95, comprised of either mechanical or electronic structure, varies the aperture of photometry aperture 94, when a user operates a switch-button, etc. In addition, since photometry means 91 is arranged at substantially the center side position of the shorter-axis of image window 92, viewing from the shooting lens side, the efficiency of the photometry would be improved by positioning the longer direction of the photometric region on that of image window 92.

As mentioned above, since the variable photometry can be achieved by varying the photometric region in an optical path, through which the light reflected by focal-plane shutter 90 incidents on (enters into) photometry means 91, it becomes possible for a photographer to select the suitable photometric region corresponding to the scene to be shot.

Further, as shown in FIG. 11 and FIG. 12, photometric region display 96, which displays the photometric region set by photometry aperture 94, is equipped in the interior of the finder. In the embodiment shown in FIG. 11, liquid-crystal finder 97a is employed for displaying the photometric region depicted by the elliptical circles. While, in the embodiment shown in FIG. 12, liquid-crystal finder 97a is also employed for displaying average photometry 97a2, weighted center photometry 97a3 and spot photometry 97a4.

Accordingly, since the photometric region is displayed on photometric region display 96 equipped in the finder, it becomes possible for the photographer to easily select the desirable photometric region.

Next, the configuration of the photometry section and the shutter section will be detailed in the following, referring FIGS. 13 and 12.

In the camera, embodied in the present invention, the photometry is achieved by means of photometry means 91 which receives a light, coming through shooting lends 100 and reflected on focal-plane shutter 90. FIG. 13 shows a perspective view of the photometry section and the shutter section and FIG. 14 shows a rear view of the photometry section and the shutter section.

Figure 13:
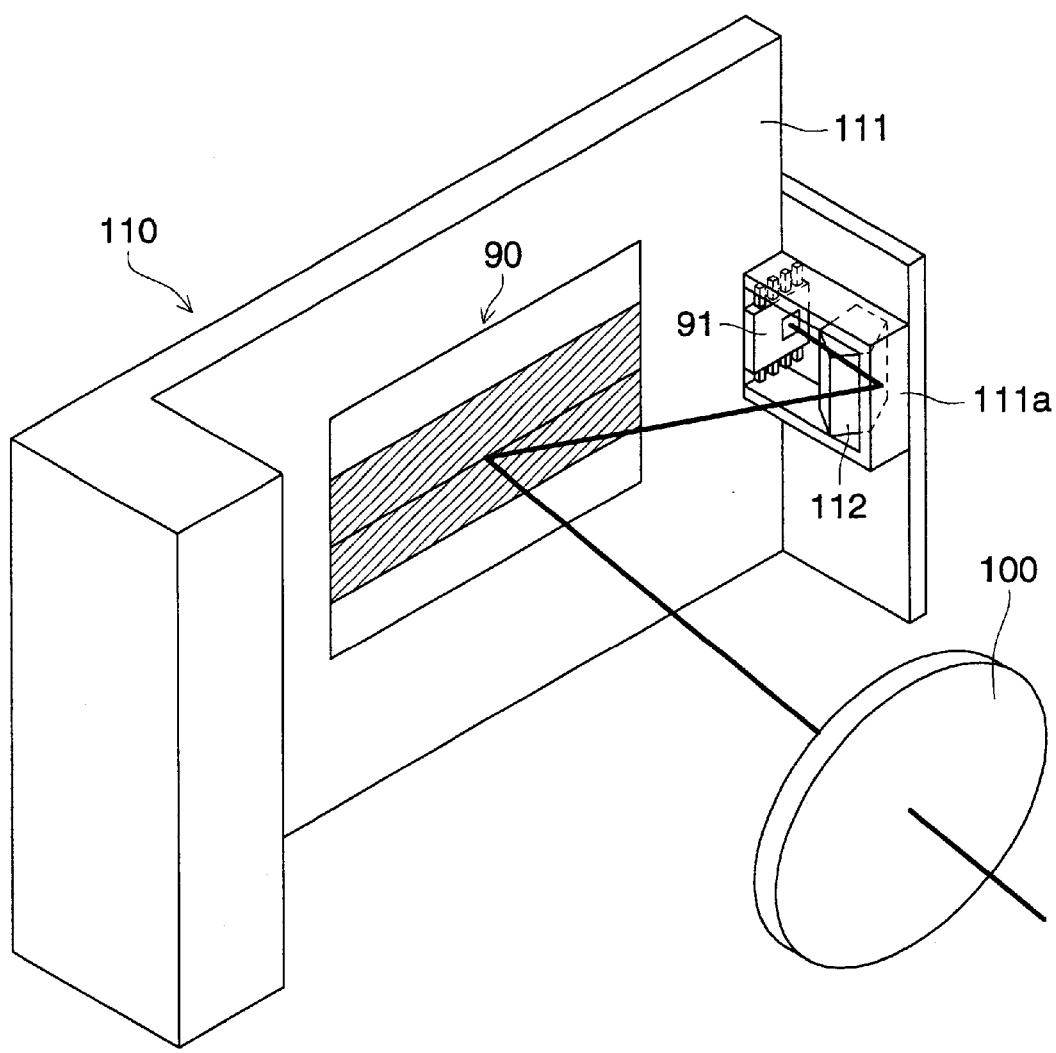
FIG. 13 shows a perspective view of a photometry section and a shutter section.

As shown in FIG. 13, focal-plane shutter 90 is equipped in shutter base 111 of focal-plane shutter unit 110. Prism 112 and photometry means 91 are mounted on mounting board 111a protruded from shutter base 111. Prism 112 and photometry means 91 are integrally assembled with focal-plane shutter unit 110 so that photometry means 91 can conduct the photometry by receiving the light coming through shooting lends 100, reflected on focal-plane shutter 90 and coming through prism 112.

Accordingly, since prism 112 and photometry means 91 are integrally assembled with focal-plane shutter unit 110, it is possible to adjust the relative position between focal-plane shutter 90 and photometry means 91 in a state of unit. Therefore, it becomes possible to detect failed units and to precisely assemble the units before assembling the unit in the camera body.

Figure 14:
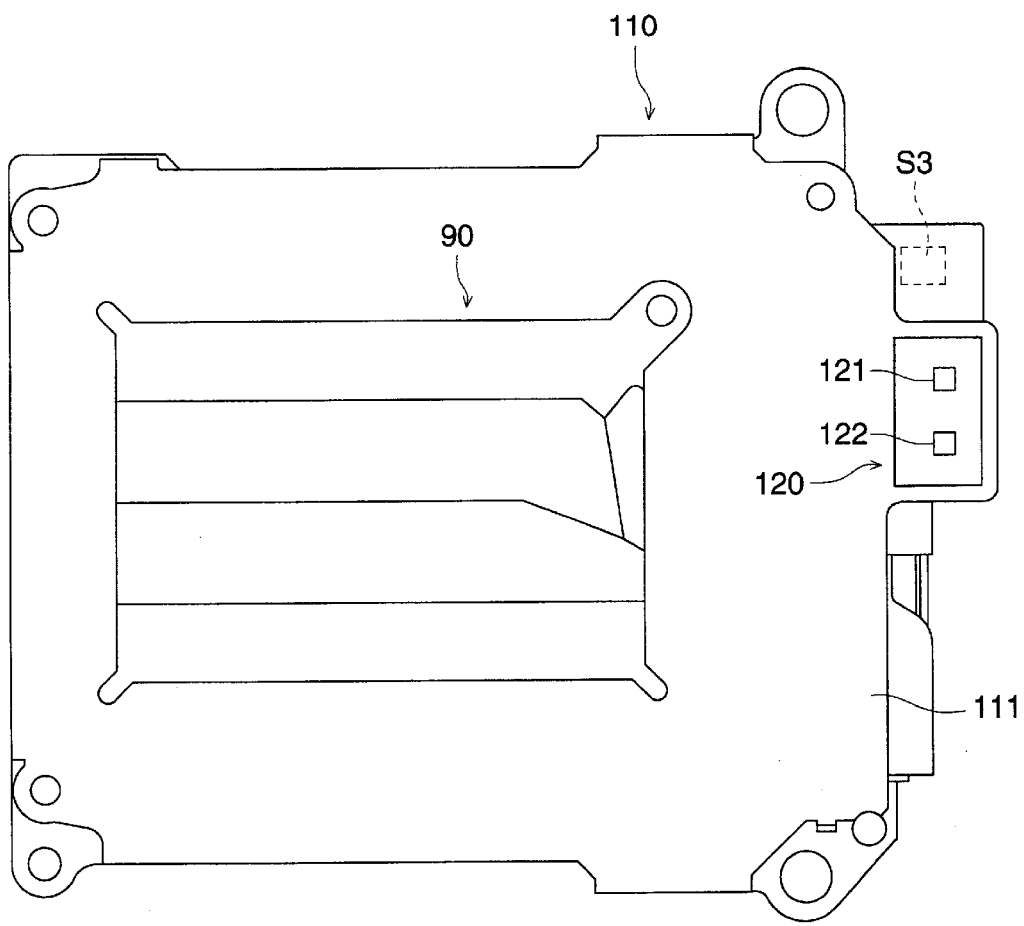
FIG. 14 shows a rear view of the photometry section and the shutter section.

Further, as shown in FIG. 14, dating means 120 is integrally arranged at the film side of focal-plane shutter unit 110 comprising focal-plane shutter 90. Projection windows 121, 122 of dating means 120 are formed on shutter base 111 of focal-plane shutter unit 110 to project date information on the standard size film through projection window 121 and on the panorama size film through projection window 122. In addition, X switch S3 is also arranged on shutter base 111 to detect the movement of the preceding shutter blind (the first blind) of focal-plane shutter 90.

Accordingly, since dating means 120 is integrally assembled with focal-plane shutter unit 110, it is possible to adjust the relative position between focal-plane shutter 90 and dating means 120 in a state of unit. Therefore, the readjustment of the relative position between them is not necessarily when performing maintenance works.

Next, the configuration of the shutter charging mechanism will be detailed in the following, referring FIGS. 15 and 16.

Figure 15:
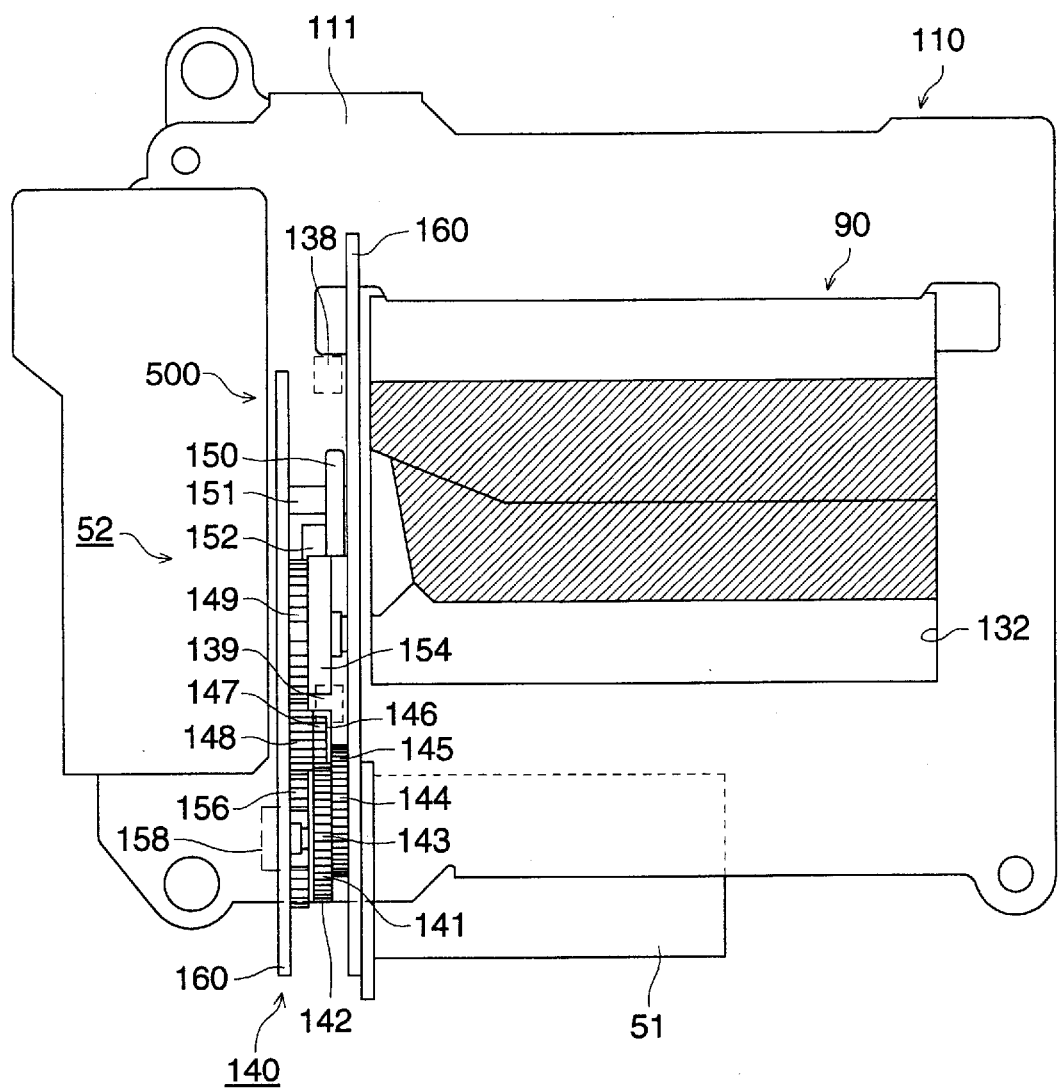
FIG. 15 shows a front view of a focal-plane shutter.
Figure 16:
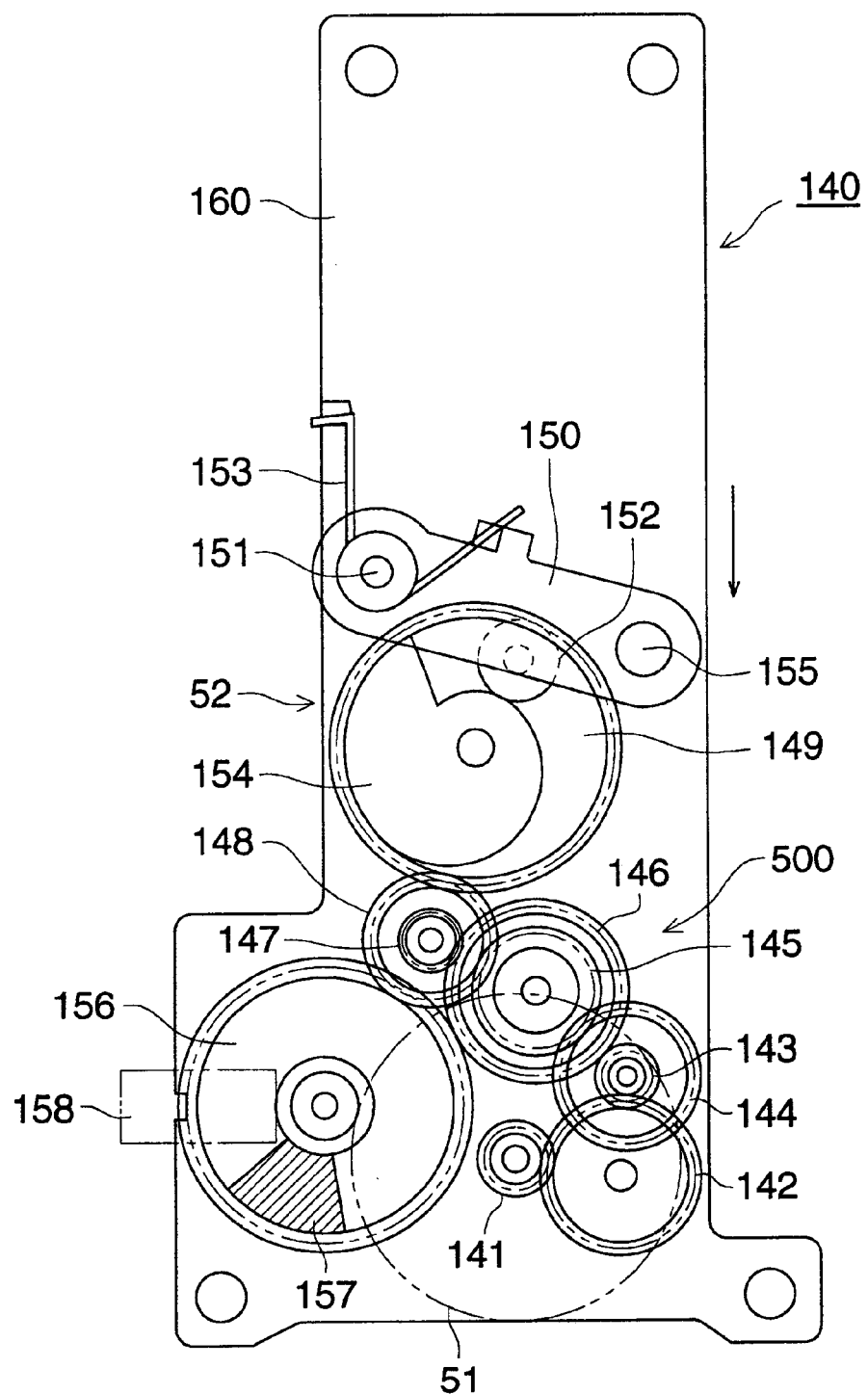
FIG. 16 shows a side view of a shutter charging section of the focal-plane shutter.

The shutter charging mechanism of the camera, embodied in the present invention, is structured as shown in FIG. 15 and FIG. 16. FIG. 15 shows a front view of the focal-plane shutter and FIG. 16 shows the shutter charging section of the focal-plane shutter.

Focal-plane shutter 90, equipped in focal-plane shutter unit 110, comprises the preceding shutter blind (the first blind) and the succeeding shutter blind (the second blind). Each of the preceding and the succeeding shutter blinds, to which an electromagnet is attached, is set in a shutter charged state by means of shutter charging unit 140 described later. In the shutter charged state, the two blinds of the preceding and the succeeding shutter blinds cover shutter aperture. When exposing the film, at first, the preceding and the succeeding shutter blinds are electrically held by activating each of the electro-magnets. Next, shutter charging unit 140 releases the mechanical setting of the shutter charged state, and then, the preceding shutter blind covers the shutter aperture, while the succeeding shutter blind move to the standby position uncovering the shutter aperture, so as to make the preceding and the succeeding shutter blinds possible to run. Then, the exposure is started with running of the preceding shutter blind driven by the spring, by deactivating electro-magnet 138 serving for the preceding shutter blind. Finally, the exposure is finished with running of the succeeding shutter blind driven by the spring, by deactivating electro-magnet 139 serving for the succeeding shutter blind.

Shutter charging unit 140, in which shutter charging mechanism 500 is assembled, is mounted on focal-plane shutter unit 110. The reciprocating shutter setting method is employed for shutter charging mechanism 500, in which shutter setting is achieved by converting the rotational movement of shutter charging motor 51, located at the lower portion of shutter base 111, to the reciprocal movement by means of shutter charging mechanism 500 comprising cams and gears.

In particular, the rotation of shutter charging motor 51 is transmitted to charge gear 149 through the reduction gear train including the first gear 142~the seventh gear 148 rotatably arranged on supporting board 160. Charging lever 150 is also rotatably interfitted into pivot axis 151 on supporting board 160, and rotatable roller 152 is attached to charging lever 150. Charge spring 153 forces charging lever 150 downward as shown by the arrow in FIG. 16 and roller 152 always touches cam 154 attached to gear 149.

Accordingly, charging lever 150 reciprocates in the vertical direction with the rotation of cam 154 attached to gear 149. When charging lever pin 155 moves upward, the preceding and the succeeding shutter blinds are set at shutter charged position. Further, the rotation of charging gear 149 is transmitted to detecting gear 156 through the seventh gear 148 to measure a revolution number of detecting board 157 stuck on detecting gear 156 by means of shutter charge reflector 158.

Next, the control circuit of the camera will be detailed in the following, referring FIG. 17.

Figure 17:
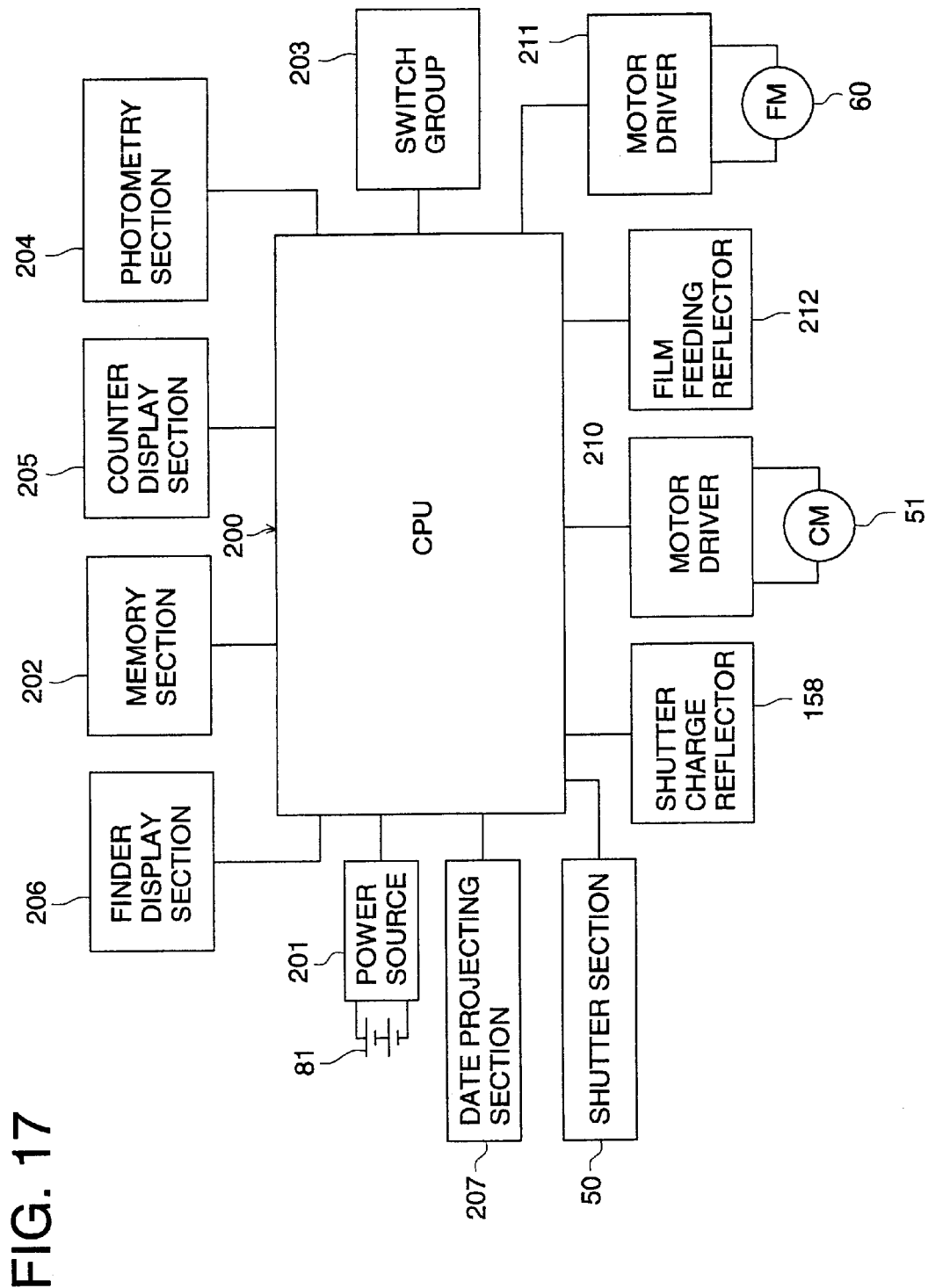
FIG. 17 shows a block-diagram of a control circuit of the camera.

FIG. 17 shows a block-diagram of the control circuit of the camera. The control circuit incorporates CPU 200 to which battery 81 supplies an electric power through power circuit 201. Memory section 202, including the rewritable EEP-ROM, etc., is coupled to CPU 200.

Based on the data sent from switch group 203, CPU 200 controls photometry section 204, counter display section 205, finder display section 206, date projecting section 207 and shutter section 50, and in addition, drives shutter charging motor 51 through motor driver 210 and film feeding motor 60 through motor driver 211. Shutter charge reflector 158 and film feeding reflector detect the state of shutter charging operation and the state of film feeding operation, respectively.

Switch group 203 includes main switch S0, switch S1 to detect the first position of release button 31, switch S2 to detect the second position of it and the rewinding switch, etc.

Next, the operation of the camera will be detailed in the following, referring FIGS. 18 through 20.

Figure 18:
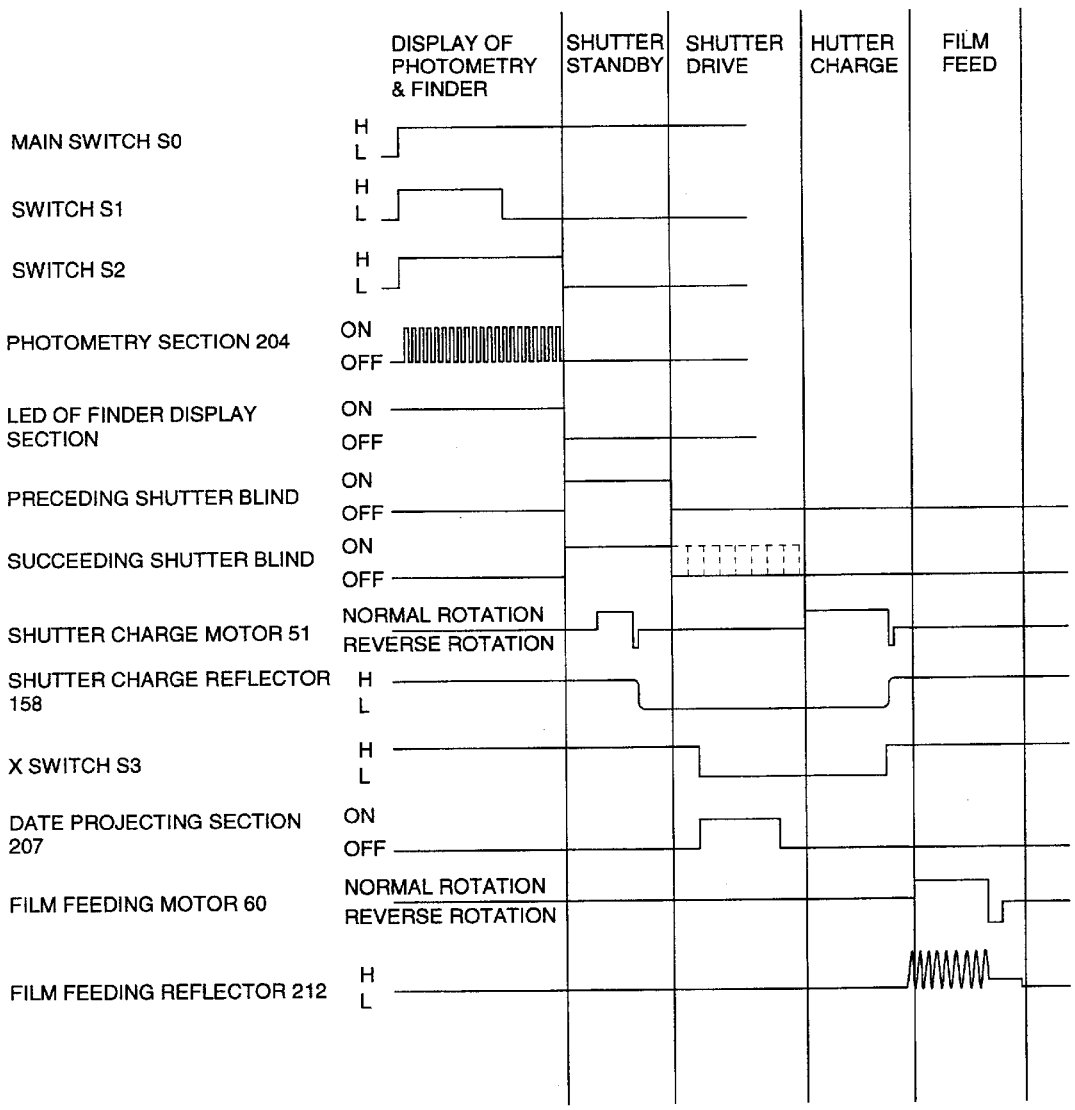
FIG. 18 shows a timing-chart of the camera.
Figure 19:
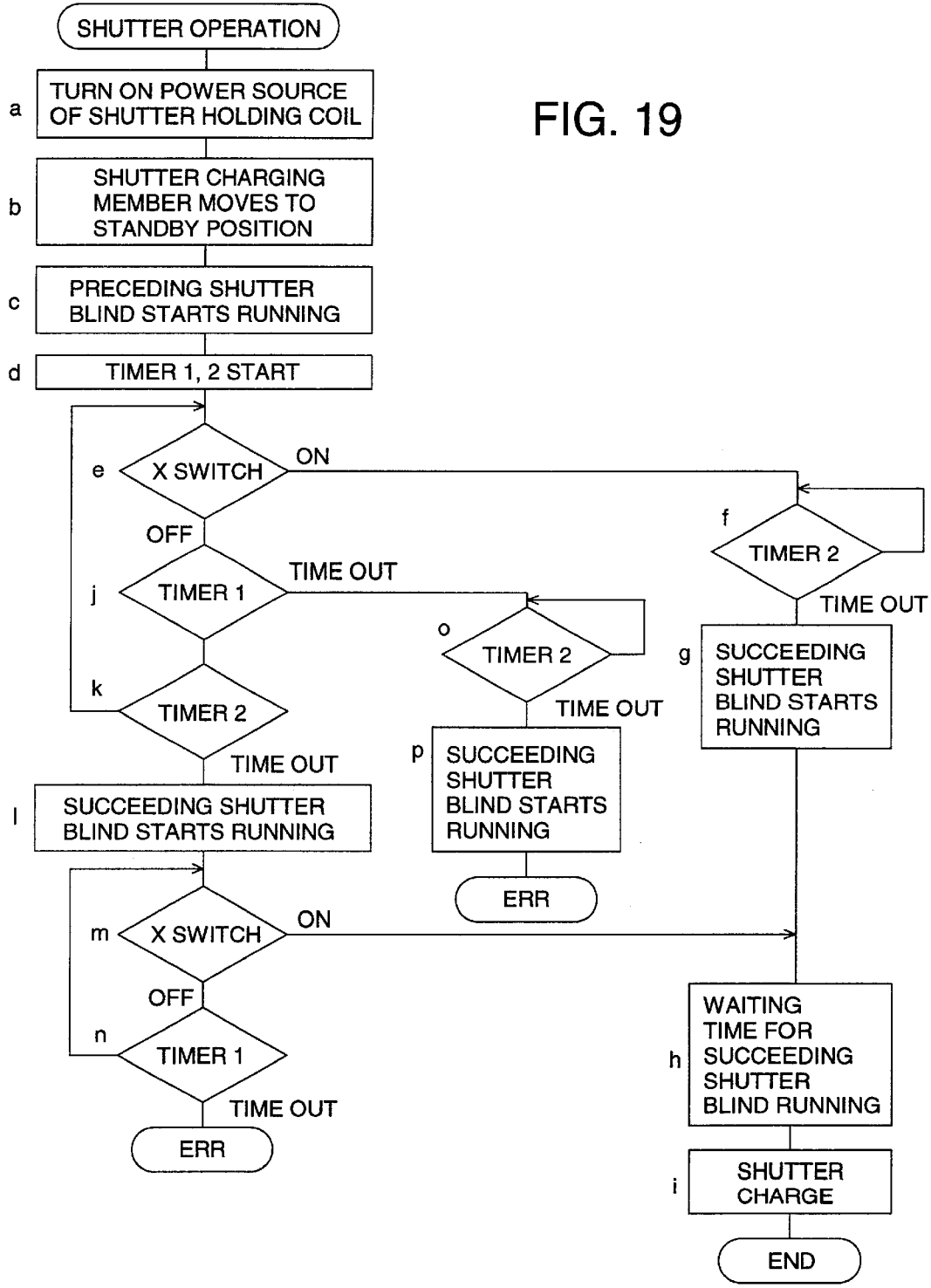
FIG. 19 shows a flow chart of the focal-plane shutter operation.
Figure 20:
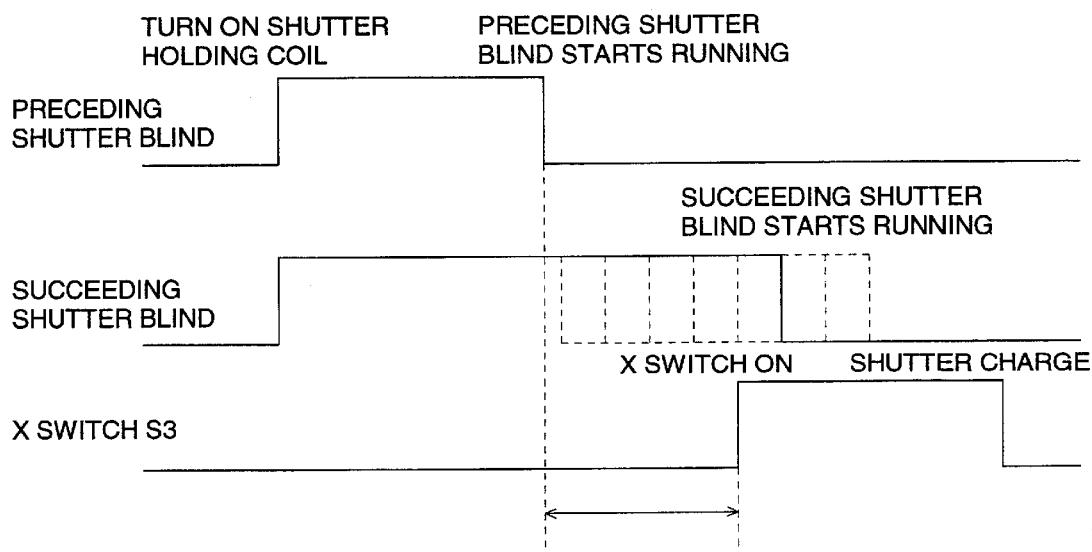
FIG. 20 shows a timing-chart of the focal-plane shutter operation.

FIG. 18 shows a timing-chart of the camera, FIG. 19 shows a flow chart of the focal-plane shutter operation and FIG. 20 shows a timing-chart of the focal-plane shutter operation.

As shown in FIG. 18, when main switch S0 turns ON, switches S1 and S2 are activated in a ready state for pushing release button 31, the photometry section 204 performs the photometry operation at a predetermined time period and CPU 200 controls finder display section 206 to display in the finder.

When release button 31 is depressed for shooting, switch S1 turns ON at the first stroke of the depression, and further, switch S2 turns ON at the second stroke of the depression, whereby finder display section 206 is deactivated to erase the image displayed in the interior of the finder.

On the other hand, the power source for the shutter holding coil is activated to supply electric-current to electromagnets 138, 139, whereby the preceding and succeeding shutter blinds are held at the shutter charged position. When the predetermined time has passed after activating electromagnets 138, 139, shutter charging motor 51 rotates in normal direction to rotate charge gear 149 in shutter charging mechanism 500, and shutter charge reflector 158 detects the rotation of detecting board 157 attached to detecting gear 156 linked to charge gear 149. When shutter charging motor 51 starts to rotate, shutter charge reflector 158 detects the high reflective portion of detecting board 157 and outputs [H] (High level). While, when charging lever 150 moves to the lower position, shutter charge reflector 158 detects the low reflective portion of detecting board 157, rotating according with movement of charging lever 150, and outputs [L] (Low level). When the output level [L] of shutter charge reflector 158 is detected, CPU 200 turns the rotational direction of shutter charging motor 51 into the reverse direction and finally deactivates shutter charging motor 51 to stop charging lever 150, comprising roller 152 contacting cam 154, at the lower standby position and to release the shutter blinds from mechanical holding by shutter charging mechanism 500. Whereby, the preceding shutter blind covers the shutter aperture, while the succeeding shutter blind move to the standby position uncovering the shutter aperture, so as to make the preceding and the succeeding shutter blinds possible to run, when deactivating electromagnets 138, 139.

When CPU 200 deactivates electromagnets 138, serving for the preceding shutter blind, in the abovementioned state, the exposure is started with running of the preceding shutter blind driven by the spring so that the preceding shutter blind opens the aperture of the shutter and X switch S3 turns ON when running of the preceding shutter blind is finished. Further, when a time period, predetermined depending on the shutter speed, has passed after the start of running of the preceding shutter blind, the succeeding shutter blind is driven by the spring so as to close the aperture of the shutter by deactivating electromagnet 139 serving for the succeeding shutter blind.

When X switch S3 turns ON, CPU 200 outputs the trigger signal for initializing the strobe lighting and activates date projecting section 207 to project the date on the film.

When a waiting time for running of the succeeding shutter blind has passed, which is predetermined at longer time than the time being necessary for completing the running of the succeeding shutter blind, CPU 200 activates shutter charging motor 51 of shutter charging mechanism 500 to rotate charge gear 149 which moves charging lever 150 upward, so as to set the preceding and the succeeding shutter blinds at the shutter charged position. When charging lever 150 sets them at the shutter charged position, CPU 200 deactivates shutter charging motor 51, and then drives film-feeding motor 60 to feed one frame of the film. When film feeding reflector 212 detects the completion of feeding one frame of the film, CPU 200 deactivates film-feeding motor 60 to finalize the film feeding.

Incidentally, when charging lever 150 sets the preceding and the succeeding shutter blinds at the shutter charged position, shutter charge reflector 158 detects the high reflective portion of detecting board 157 and outputs [H] (High level). Accordingly, the stopping process of shutter charging motor 51 is conducted on the basis of output level [H] of shutter charge reflector 158.

In the abovementioned state, since two blinds of the preceding and the succeeding blinds cover the aperture of the shutter, no leakage of the light will occur.

Next, the operation of the focal-plane shutter will be detailed in the following, referring FIG. 19 and FIG. 20.

In step a of FIG. 19, the power source for the shutter holding coil is activated to supply electric-current to electro-magnets 138, 139, whereby the preceding and succeeding shutter blinds are held at the shutter charged position. In step b, shutter-charging motor 51 rotates in normal direction to move charging lever 150 of shutter-charging mechanism 500 from upper position to lower standby position enabling the running of the shutter blinds. In step c, when CPU 200 deactivates electromagnet 138, the exposure is started with running of the preceding shutter blind driven by the spring, and in step d, timer 1 and timer 2 start to clock the time. Timer 1 clocks predetermined time period t1 corresponding to the time until X switch S3 turns ON, and timer 2 clocks shutter opening time t2.

In step e, either ON or OFF state of X switch S3 is detected. In step f, when X switch S3 turns ON, CPU 200 determines whether or not shutter opening time t2 of timer 2 has passed, after activating the strobe trigger and the date projector (not shown in the drawings). In step g, when shutter opening time t2 has passed, CPU 200 deactivates electro-magnet 139, whereby the succeeding shutter blind is driven by the spring. When the waiting time for running of the succeeding shutter blind has passed in step h, shutter charging motor 51 rotates in normal direction to rotate charge gear 149 which moves charging lever 150 upward, so as to set the preceding and the succeeding shutter blinds at the shutter charged position in step i.

When X switch S3 turns OFF in step e, CPU 200 determines whether or not predetermined time period t1 has passed in step j. When not, CPU 200 determines whether or not shutter opening time t2 of timer 2 has passed in step k. When CPU 200 determines that shutter opening time t2 of timer 2 has passed in step k, CPU 200 deactivates electro-magnet 139 and succeeding shutter blind is driven by the spring. Then, either ON or OFF state of X switch S3 is detected in step m. When X switch S3 turns OFF, in step n, CPU 200 determines whether or not X switch S3 turns ON until the predetermined time t1 of timer 1 has passed. If not, CPU 200 determines error state.

In case that X switch S3 turns ON in step m, CPU 200 enters in step h after activating the strobe trigger and the date projector (not shown in the drawings), and when the waiting time for running of the succeeding shutter blind has passed, the aforementioned shutter charging operation is performed in step i.

Further, judgment of timer 1 is performed in step j, and when the predetermined time t1, corresponding to the time until X switch S3 turns ON, has passed, judgment of timer 2 is performed in step o. When the shutter opening time of timer 2 has passed, after the succeeding shutter blind is driven by the spring, by deactivating electromagnet 139, CPU 200 determines error state to stop operations and to conduct error jobs such as display of the warning, ban of rewinding, etc.

As mentioned above, CPU 200 makes judgments based on the states of X switch S3 and timer 1, namely, when X switch S3 turns ON preceding to the time elapse of timer 1, CPU 200 determines normal state of the shutter, while, when the predetermined time t1 of timer 1 has passed before X switch S3 turns ON, CPU 200 determines error state.

Shutter opening time t2 of timer 2 is variable depending on the shutter speed and elapses either before or after X switch S3 and predetermined time t1 of timer 1 passes over.

Accordingly, the camera comprises a X switch signal detecting means for detecting X switch signal of focal-plane shutter 90 and a controlling means for performing error jobs when X switch S3 does not turns ON within the predetermined time after depressing the shutter release button. The X switch signal detecting means and the controlling means are configured in CPU 200. Since X switch S3 turns ON only when the succeeding blind completely running through the aperture, it is possible to detect an error state caused by a certain malfunction, when X switch S3 does not turns ON within the predetermined time after the succeeding blind starts running. Thus, the photographer can easily perceive the error state of the camera with the liquid-crystal display and/or the warning sound activated when the shooting becomes impossible due to a certain malfunction in focal-plane shutter 90.

Next, the sequential operations of the camera will be detailed in the following, referring FIGS. 21 through 29.

Figure 21:
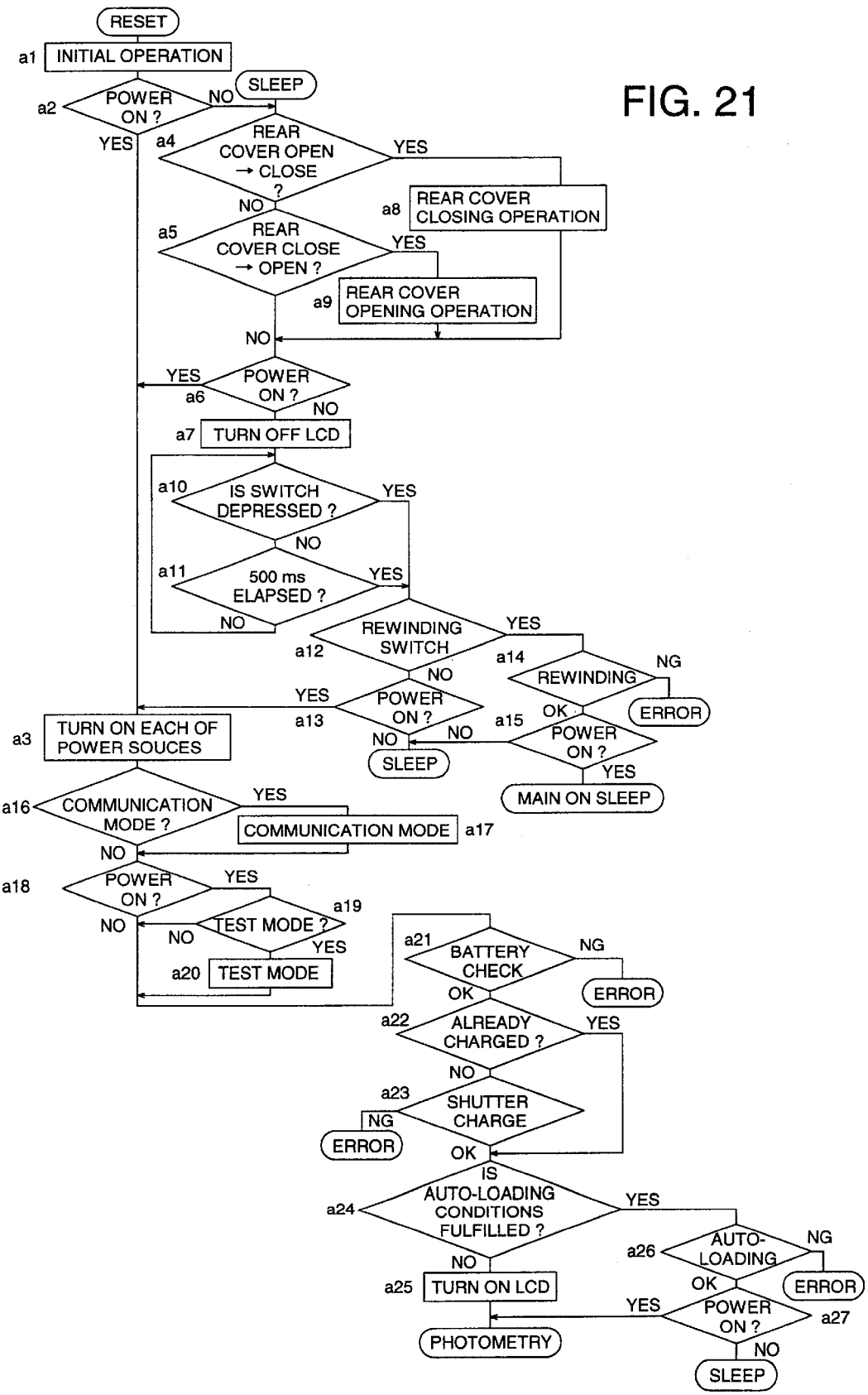
FIG. 21 shows a flowchart of a main routine of the camera.

FIG. 21 shows a flowchart of the main routine of the camera.

The main routine of the camera comprises the following steps of: step a1; performing the initial operation when the main power switch turns ON, step a2; determining either power ON or OFF, step a3; turning each of power sources ON when determining power ON in step a2, step a4; determining whether or not the status of rear cover 11 is changed to the closed state from the open state when power OFF in step a2, step a5; determining whether or not the status of rear cover 11 is changed to the open state from the closed state when not in step a4, step a6; determining either power ON or OFF when not in step a5, step a3; turning each of power sources ON when determining power ON in step a6, step a7; deactivating counter display section 205 of the liquid-crystal display when power OFF in step a6, step a8; performing the rear cover closing processing, including, for instance, the judgment for automatic loading condition, etc., when determining that the status of rear cover 11 is changed to the closed state from the open state in step a4, and step a9; performing the rear cover opening processing, including, for instance, the conversion of the counter display, etc., when determining that the status of rear cover 11 is changed to the open state from the closed state in step a5.

The main routine of the camera further comprises the following steps of: step a10; determining whether or not one of push-switches is depressed when deactivating counter display section 205 of the liquid-crystal display in step a7, step a11; continuing the action of determining whether or not one of push-switches is depressed until 500 ms elapses, step a12; determining whether or not the rewinding switch turns ON when one of push-switches is depressed in step a10 or when 500 ms elapses in step a11, step a13; determining either power ON or OFF when not in step a12, step a3; turning each of power sources ON when power ON in step a13, step a14; performing the rewinding action when the rewinding switch turns ON in step a12, and performing error jobs when the rewinding action is failed, and step a15; determining either power ON or OFF when the rewinding action is finished and entering into the main ON-sleep routine when power ON or entering into the sleep routine when power OFF as well as when power OFF in step a13.

The main routine of the camera further comprises the following steps of: step a16; determining whether or not the camera enters into the communication mode for testing the camera with flag signals when each of power sources turns ON in step a3, step a17; entering into the communication mode in which the camera is connected to, for instance, a Personal Computer to test its functions when determining that the camera enters into the communication mode in step a16, step a18; determining either power ON or OFF when not in step a16 or when the communication mode is finalized, step a19; determining whether or not the camera enters into the test mode when power ON in step a18, step 20; performing the test mode when the camera enters into the test mode in step a19, and step a21; performing the battery check when the test mode is finished, when power OFF in step a18 or when not in step a19, and performing error jobs when the batteries are out of power as a result of the battery check.

The main routine of the camera further comprises the following steps of: step a22; determining whether or not the shutter charging operation is already completed when the batteries are good as a result of the battery check in step a21, step a23; performing the shutter charging operation and determining whether or not the shutter charging operation is normally completed when not in step a22, and step a24; performing error jobs when the shutter charging operation is failed due to, for instance, a mechanical entrapment in the mechanism, etc., or determining whether or not the automatic loading condition is fulfilled when the shutter charging operation is normally completed or already completed in step a22. Incidentally, the automatic loading condition is to detect the film loading state by means of DX code, when the rear cover is closed.

Now, the shutter charging operation, performed in step a23 when determining that the shutter charging operation is not completed in step a22, will be detailed in the following, referring FIG. 22 and FIG. 23.

Figure 22:
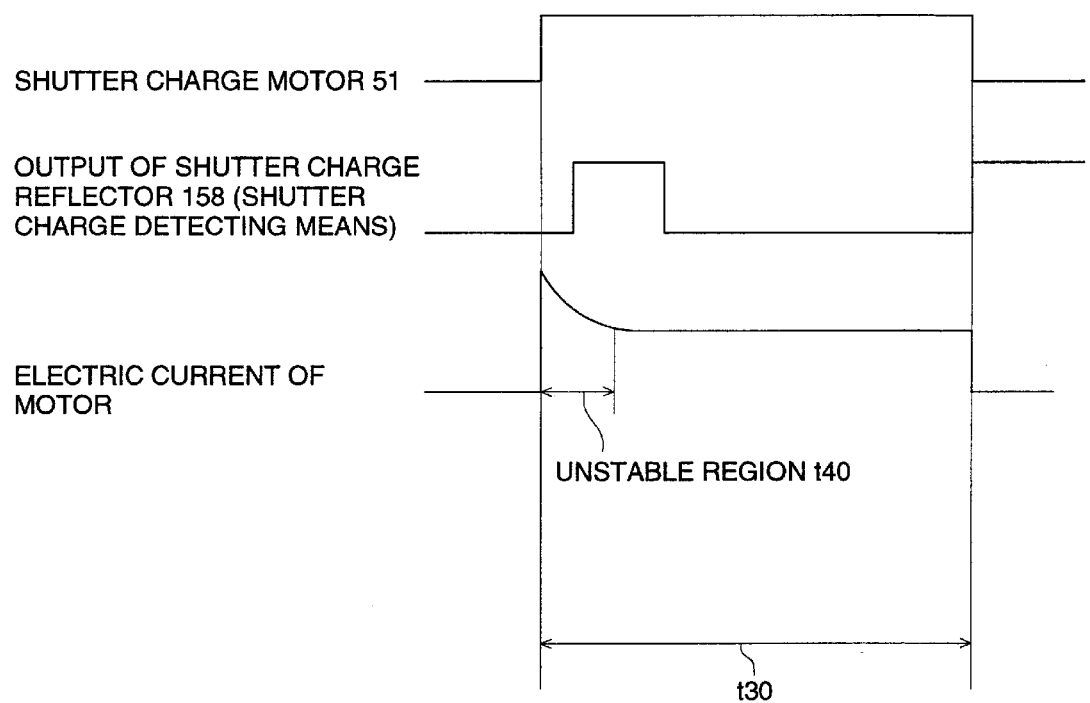
FIG. 22 shows an explanatory timing-chart for detecting a shutter charged state.
Figure 23:
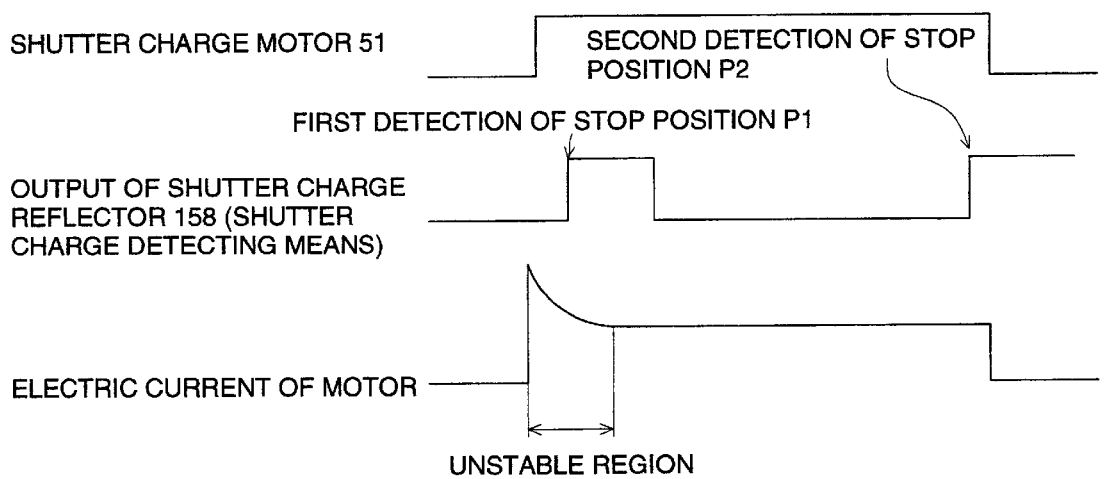
FIG. 23 also shows an explanatory timing-chart for detecting a shutter charged state.

The embodiment of the camera shown in FIG. 22 comprises a shutter charge detecting means, including shutter charge reflector 158, for detecting the state of shutter charging operation, and a shutter charge determining means, configured in CPU 200, for determining the state of shutter charging operation based on the signals outputted from the shutter charge detecting means. When the shutter charge determining means determines that the shutter is in an incomplete charged state, the shutter charging operation, driven by shutter charging motor 51, continues for longer time than the normal time period required for one routine of the shutter charge, after shutter charging motor 51 is driven, and CPU 200 bans the action to determine the state of shutter charging operation based on the signals outputted from the shutter charge detecting means within the predetermined time t30.

Since, in the incomplete charged state, the standby position of detecting board 157 linked to shutter charging motor 51 is uncertain relative to the position of shutter charge reflector 158, after shutter charging motor 51 is driven, the shutter charging operation continues for longer time, namely, the predetermined time t30, than the normal time period required for one routine of the shutter charge. In addition, CPU 200 bans the determining action for the state of shutter charging operation, based on the signals outputted from the shutter charge detecting means, within the predetermined time t30 to disable the braking action during the unstable current time t30 at the starting period of shutter charging motor 51. Therefore, it is possible to reduce the capacity of the RAM-memory for memorizing data of detecting the shutter charging operation and to simplify the program of it, since only the braking time after the motor current stabilizes is necessary to be memorized.

In another method shown in FIG. 23, when the shutter charge determining means determines that the shutter is in an incomplete charged state, CPU 200 stops shutter charging motor 51 based the second and later charge-completion decision made by the shutter charge determining means, after the first charging operation, initiating with the start of driving shutter charging motor 51, is finished.

As mentioned above, when determining the incomplete charged state, CPU 200 does not stop shutter charging motor 51 at the first detecting point P1 of the stopping position, but stops at the second detecting point P1 of the stopping position, after the first charging operation, initiating with the start of driving shutter charging motor 51, is finished. Since CPU 200 stops shutter charging motor 51 based the second and later charge-completion decision to ensure the necessary time period for stabilizing the shutter charging motor 51 at a constant revolution speed, the braking action is disabled during the drive-current fed to shutter charging motor 51 is unstable. Therefore, it is possible to reduce the capacity of the RAM-memory for memorizing data of detecting the shutter charging operation and to simplify the program of it, since only the braking time after the motor current stabilizes is necessary to be memorized.

Turning back to FIG. 21, the main routine of the camera further comprises the following steps of: step a25; activating counter display section 205 of the liquid-crystal display and entering into the photometry sub-routine when not in step a24, step a26; performing the automatic loading operation and determining whether or not the automatic loading operation is completed normally when determining that the automatic loading condition is fulfilled in step a24, and performing the error jobs when the automatic loading operation is failed, and step a27; determining either power ON or OFF when determining that the automatic loading operation is completed normally in step a26, and entering into the photometry sub-routine when power ON or entering into the sleep sub-routine when power OFF.

Figure 24:
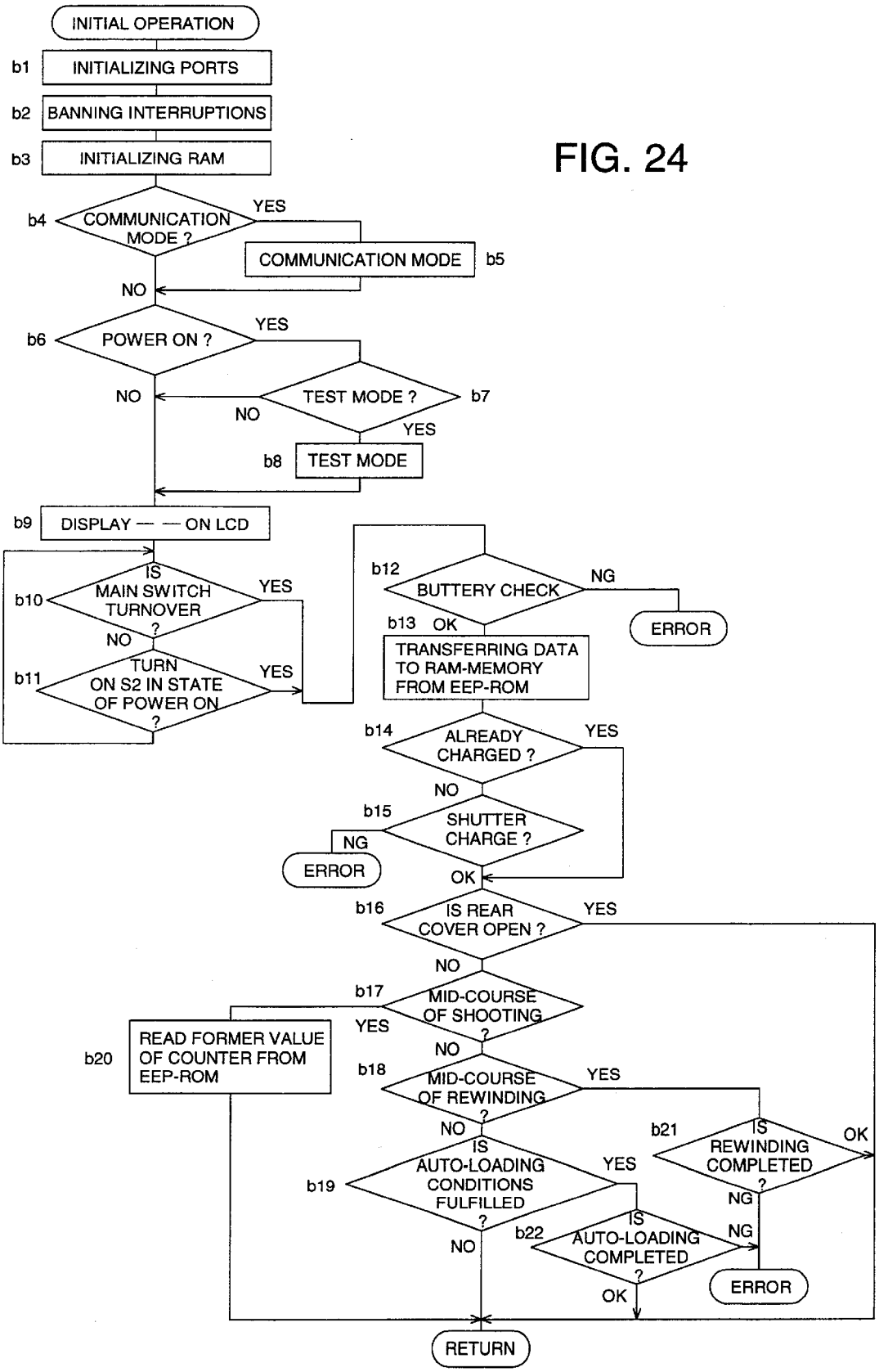
FIG. 24 shows a flowchart of an initial operation sub-routine.

FIG. 24 shows a flowchart of the initial operation sub-routine.

The initial operation sub-routine of the camera comprises the following steps of: step b1; initializing the port, step b2; banning interruptions, step b3; initializing the RAM-memory, step b4; determining whether or not entering into the communication mode, step b5; entering into the communication mode when determining that entering into the communication mode in step b4, step b6; determining either power ON or OFF when not in step b4, step b7; determining whether or not entering into the test mode, and step b8; performing the test mode when determining that entering into the test mode in step b7.

The initial operation sub-routine of the camera further comprises the following steps of: step b9; displaying the bar symbol of [- -] on counter display section 205 of the liquid-crystal display after the test mode is completed or when power OFF in step b6 or when not in step b7, step b10; determining whether or not the main switch is turnover, step b11; activating release button 31 in the state of power ON and determining whether or not switch S2 turns ON when not in step b10, and step b12; performing the battery check when determining that the main switch is turnover in step b10 or when determining that switch S2 turns ON in step b11 and performing error jobs when the batteries are out of power as a result of the battery check.

The initial operation sub-routine of the camera further comprises the following steps of: step b13; transferring data to the RAM-memory from the EEP-ROM when the batteries are good as a result of the battery check in step b12, step b14; determining whether or not the shutter charging operation is already completed, step b15; performing the shutter charging operation when not in step b14 and determining whether or not the shutter charging operation is normally completed, and performing error jobs when the shutter charging operation is failed, step b16; determining whether rear cover 11 is open or closed when determining that the shutter charging operation is normally completed in step b15 or when determining that the shutter charging operation is already completed in step b14, step b17; determining whether or not the camera is mid-course of shooting when determining that rear cover 11 is closed in step b16, step b18; determining whether or not the camera is mid-course of rewinding when not in step b17, and' step b19; determining whether or not the automatic loading condition is fulfilled when not in step b18, and returning to the main routine when determining that the automatic loading condition is not fulfilled as well as when determining that rear cover 11 is open in step b16.

In step b20, when the camera is mid-course of shooting in step b17, CPU 200 reads the former value of the counter from the EEP-ROM. For instance, even if the battery is removed for changing to new one in the mid-course of shooting, the value of the counter is not in error, since the former value of the counter is read from the EEP-ROM.

Since the film rewinding sound sometimes makes noisy nuisance of other people depending on locations, the camera has a feature for allowing photographer to stop the film rewinding operation in the mid-course of it. In step b18, CPU 200 determines whether or not the film rewinding operation was stopped in the mid-course of it, before the battery change. In step b21, CPU 200 performs the continuation of the film rewinding operation when CPU 200 determines that the film rewinding operation was stopped in the mid-course of it, and returns to the main-routine when the film rewinding operation is completed or performs error jobs when the film rewinding operation is failed. When the photographer changes the battery while the film rewinding operation is stopped in the mid-course of it, the photographer would possibly forgot to activate the film rewinding operation again. To avoid the double exposure on the already exposed picture frame in the above case, CPU 200 determines whether or not the film rewinding operation was stopped in the mid-course of it, and automatically rewinds the film when CPU 200 determines that the film rewinding operation is in the mid-course of it.

Further, in step b22, CPU 200 performs the automatic loading operation when determining that the automatic loading condition is fulfilled in step b19, and determines whether or not the automatic loading operation is normally completed, and then, performs error jobs when the automatic loading is failed, or returns to the main routine when the automatic loading is completed normally.

Figure 25:
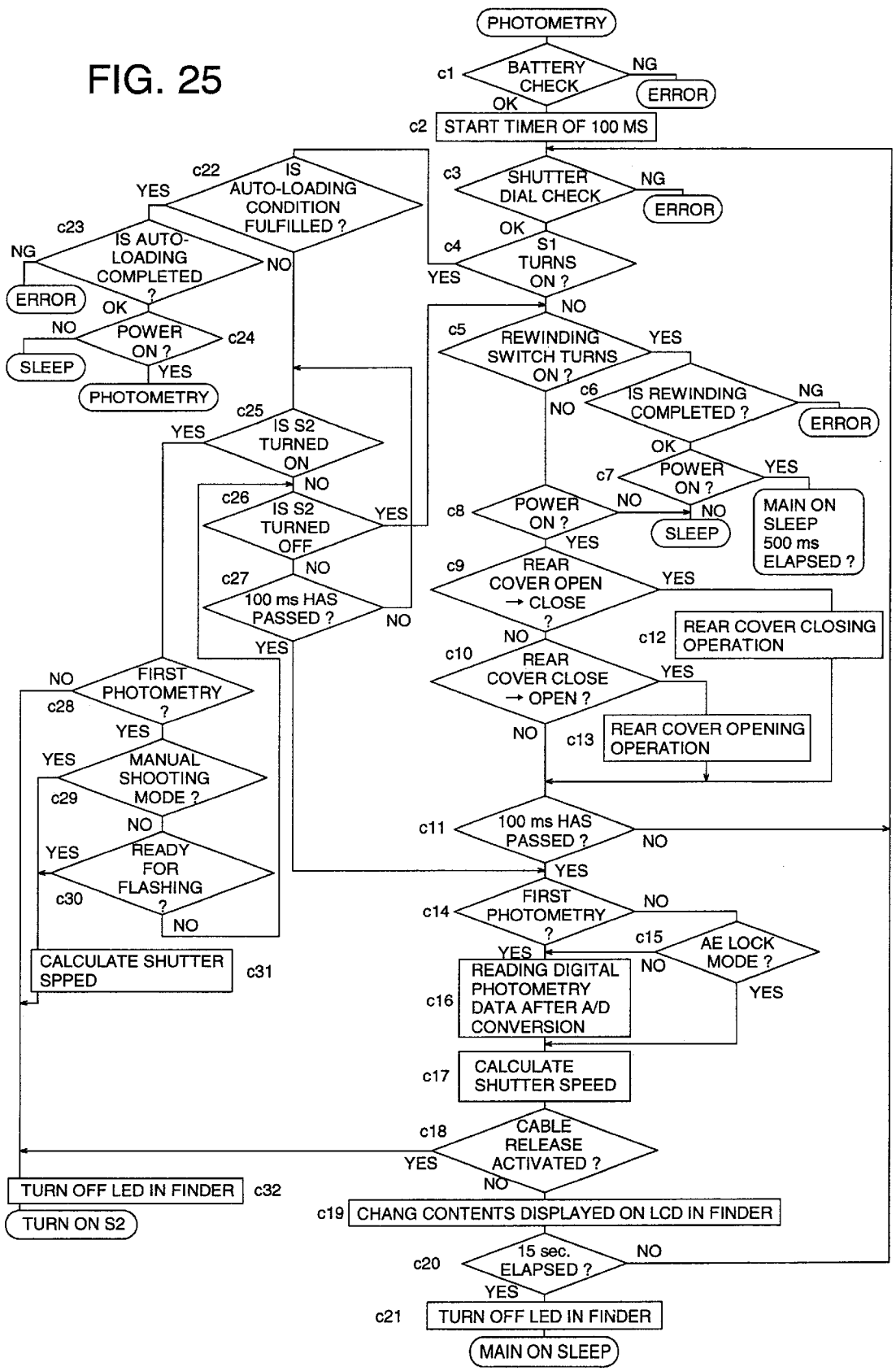
FIG. 25 shows a flowchart of a photometry sub-routine.

FIG. 25 shows a flowchart of the photometry sub-routine.

The photometry sub-routine of the camera comprises the following steps of: step c1; performing the battery check, and performing error jobs when the batteries are out of power as a result of the battery check, step c2; starting the timer of 100 ms when the batteries are good as a result of the battery check in step c1, and step c3; determining either the AE (Automatic Exposure) shooting mode or the manual shooting mode with a shutter speed set by the photographer by means of shutter dial 32, and performing the dial check to read the IS0 sensitivity and the exposure compensating information from ISO/exposure compensation dial 33. When CPU 200 reads the instruction of the AE shooting mode, or the instruction of the shutter speed for the manual shooting, and/or the ISO sensitivity and the exposure compensating information from ISO/exposure compensation dial 33, the value of the proper shutter speed for the AE shooting mode, or the value of the shutter speed set by the photographer and the value of the proper shutter speed is/are displayed in the interior of the finder. In case of the manual shooting, the value of the shutter speed set by the photographer is displayed by the constant lighting, while the value of the proper shutter speed is displayed by the periodical flashing of light. The timer of 100 ms set in step c2 is also utilized for setting the flashing period of the light displayed in the finder.

In step c3, CPU 200 performs error jobs when the dial check value is abnormal due to, for instance, positioning errors of shutter dial 32 and/or ISO/exposure compensation dial 33 caused by mechanical entrapments, etc. In step c4, CPU 200 determines whether switch S1 turns ON or OFF, when shutter dial 32 and ISO/exposure compensation dial 33 is set at the normal position and the instruction of the AE shooting mode or the shutter speed for the manual shooting, and/or the IS0 sensitivity and the exposure compensating information are normally read into CPU 200.

The photometry sub-routine of the camera further comprises the following steps of: step c5; determining whether the rewinding switch turns ON or OFF when switch S1 turns OFF in step c4, step c6; performing the rewinding action when the rewinding switch turns ON in step c5, and performing error jobs when the rewinding action is failed, step c7; determining either power ON or OFF when the rewinding action is normally completed in step c6, and entering into the main ON-sleep routine when power ON or entering into the sleep routine when power OFF, step c8; determining either power ON or OFF when the rewinding switch turns OFF in step c5, and entering into the sleep routine when power OFF, step c9; determining whether or not the status of rear cover 11 is changed to the closed state from the open state when power ON in step c8, step c10; determining whether or not the status of rear cover 11 is changed to the open state from the closed state when not in step c9, and step c11; determining whether or not 100 ms has passed when not in step c10, and returning to step c3 when 100 ms has not passed.

The photometry sub-routine of the camera further comprises the following steps of: step c12; performing the rear cover closing processing, including, for instance, the judgment for automatic loading condition, etc., when determining that the status of rear cover 11 is changed to the closed state from the open state in step c9, step c13; performing the rear cover opening processing, including, for instance, the conversion of the counter display, etc., when determining that the status of rear cover 11 is changed to the open state from the closed state in step c10, step c14; determining whether or not the photometry is the first time when determining that 100 ms has passed in step c11, step c15; determining whether or not the AE lock mode is activated when not in step c14, step c16; reading the digital photometry data after converting the analog photometry data to the digital photometry data when not in step c15, and step c17; calculating the shutter speed based on the digital photometry data.

When CPU 200 determines that the photometry is the first time in step c14, CPU 200 enters step c16 and reads the digital photometry data after converting the analog photometry data to the digital photometry data, and then, in step c17, calculates the shutter speed based on the digital photometry data.

Figure 27:
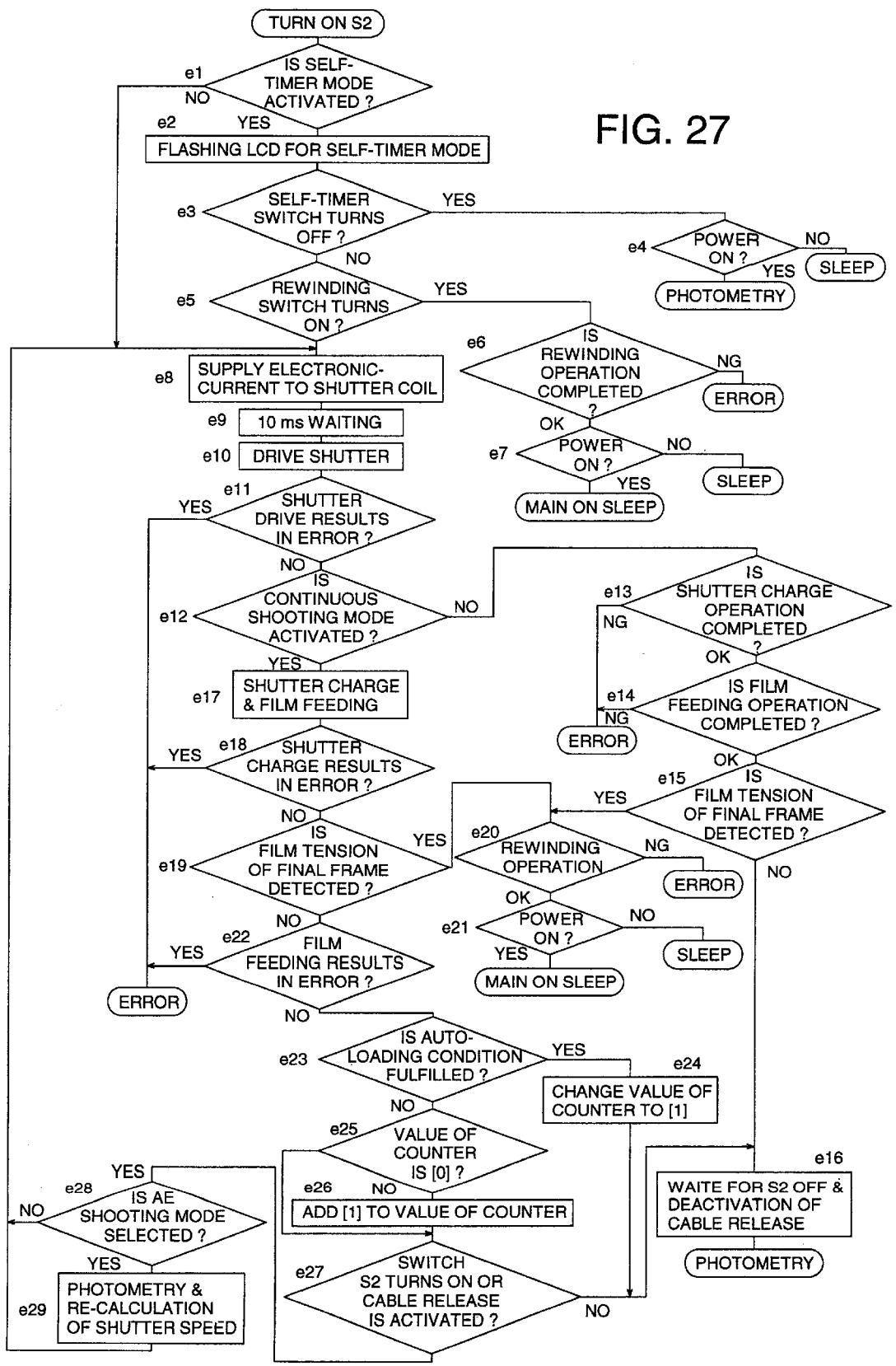
FIG. 27 shows a flowchart of a real-exposure sub-routine.

The photometry sub-routine of the camera further comprises the following steps of: step c18; determining whether or not the cable release is activated, and entering step c32, in which deactivating the liquid-crystal display in the finder and entering the real exposure sub-routine as shown in FIG. 27, when determining that the cable release is activated, step c19; changing the contents displayed on the liquid-crystal display in the finder corresponding to the result of the shutter speed calculation performed in step c17 when not in step c18, step c20; determining whether or not 15 seconds have passed, and returning to step c3 when determining that 15 seconds have not passed, and step 21; deactivating the liquid-crystal display in the finder and entering the routine after the photometry when determining that 15 seconds have passed in step c20.

When switch S1 turns ON during the photometry operation described above, CPU 200 enters into the shutter operation mode, shifting-to step c22 from step c4.

The photometry sub-routine of the camera further comprises the following steps of: step c22; determining whether or not the automatic loading condition is fulfilled, step c23; performing the automatic loading operation and determining whether or not the automatic loading operation is completed normally when determining that the automatic loading condition is fulfilled in step c22, and performing the error jobs when the automatic loading operation is failed, step c24; determining either power ON or OFF when determining that the automatic loading operation is completed normally in step c23, and returning to step c1 when power ON or entering into the sleep sub-routine when power OFF, step c25; determining whether switch S2 turns ON or OFF when not in step c22, step c26; determining whether switch S1 turns ON or OFF when determining that switch S2 turns OFF in step c25, and entering step c5 when determining that switch S1 turns OFF or entering step c27 when determining that switch S1 turns ON, step c27; entering step c14 when switch S2 does not turn ON and switch S1 does not turn OFF until 100 ms has passed, step c28; determining whether or not the photometry is the first time when determining that switch S2 turns ON in step c25, step c32; deactivating the liquid-crystal display in the finder when not in step c28, and entering step e1 of the real exposure sub-routine shown in FIG. 27 after switch S2 turns ON, step c29; determining whether or not the camera is in the manual shooting mode when determining that the photometry is the first time in step c28, step c31; calculating the shutter speed when determining that the camera is in the manual shooting mode in step c29 and entering step c32, and step c30; determining whether or not the camera is ready for flashing based on the charge completion signal of the strobe section when not in step c29, and entering step c32 through step c31 when determining that the camera is ready for flashing or returning to step c26 when determining that the camera is not ready for flashing.

Figure 26:
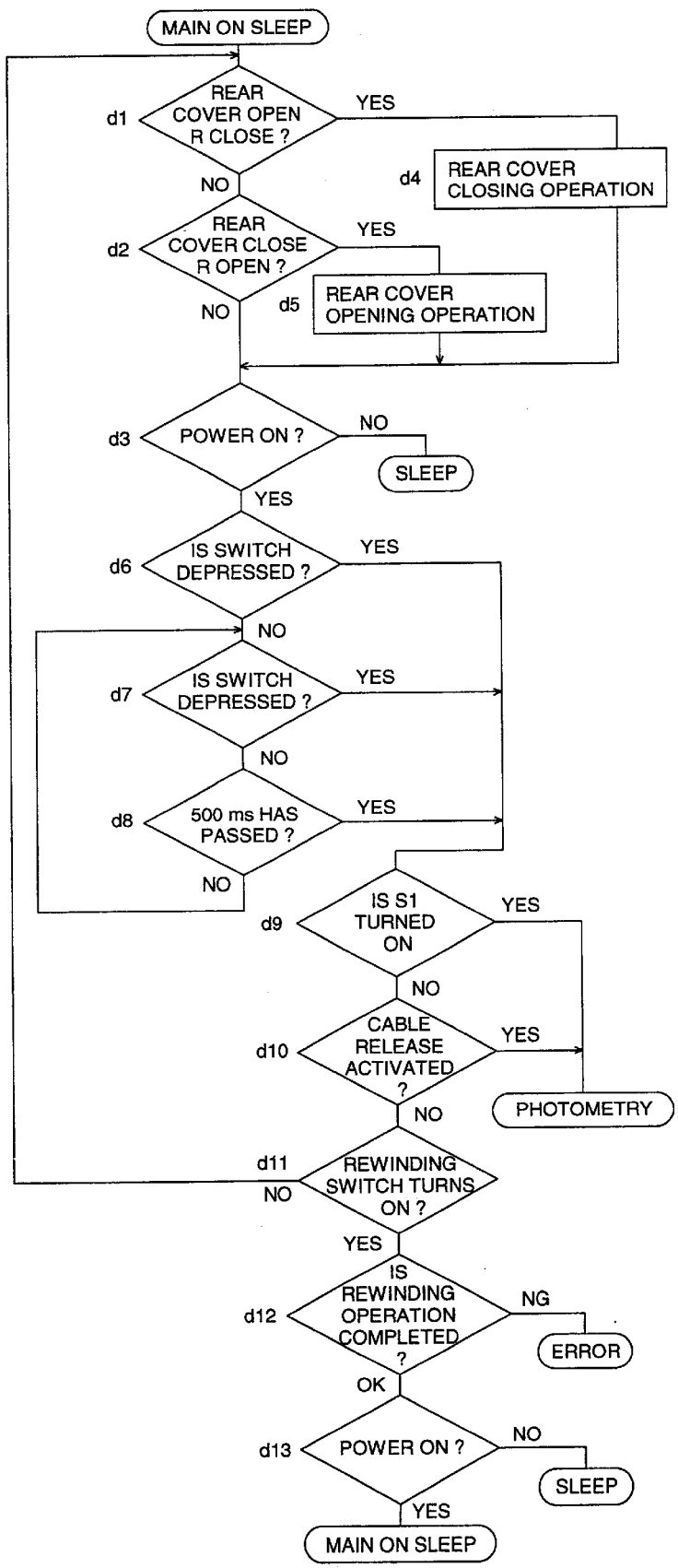
FIG. 26 shows a flowchart of a main ON-sleep sub-routine, which is performed after the photometry is finished and 15 second has passed since the main routine is activated.

FIG. 26 shows a flowchart of the main ON-sleep sub-routine, which is performed after the photometry is finished and 15 second has passed since the main routine is activated.

The main ON-sleep sub-routine of the camera comprises the following steps of: step d1; determining whether or not the status of rear cover 11 is changed to the closed state from the open state, step d2; determining whether or not the status of rear cover 11 is changed to the open state from the closed state when not in step d1, step d3; determining either power ON or OFF when not in step d2, step d4; performing the rear cover closing processing, including, for instance, the judgment for automatic loading condition, etc., when determining that the status of rear cover 11 is changed to the closed state from the open state in step d1, step d5; performing the rear cover opening processing, including, for instance, the conversion of the counter display, etc., when determining that the status of rear cover 11 is changed to the open state from the closed state in step d2, step d6; entering into the sleep routine when power OFF in step d3, or determining whether or not one of push-switches is depressed when power ON in step d3, and step d7, d8; continuing the action of determining whether or not one of push-switches is depressed until 500 ms elapses, when not in step d6.

The main ON-sleep sub-routine of the camera further comprises the following steps of: step d9; determining whether switch S1 turns ON or OFF, and entering into the photometry routine when determining that switch S1 turns ON, step d10; determining whether or not the cable release is activated when determining that switch S1 turns OFF in step d9, and entering into the photometry routine when the cable release is activated, step d11; determining whether the rewinding switch turns ON or OFF when not in step d10, and returning to step d1 when determining that the rewinding switch turns OFF, step d12; performing the rewinding action when determining that the rewinding switch turns ON in step d11, and determining whether or not the rewinding action is normally completed, and performing error jobs when the rewinding action is failed, and step d13; determining either power ON or OFF when determining that the rewinding action is normally completed, and entering into the sleep routine when power OFF or entering into the main ON-sleep routine when power ON.

FIG. 27 shows a flowchart of the real-exposure sub-routine.

The real-exposure sub-routine of the camera comprises the following steps of: step e1; determining whether or not the self-timer mode is activated when switch S1 turns ON to enter the real-exposure mode, step e2; flashing the liquid-crystal display to indicate the self-timer mode, step e3; determining whether or not the self-timer switch turns ON or OFF during the self-timer mode, step e4; determining either power ON or OFF when determining that the self-timer switch turns OFF, and entering into the sleep routine when power OFF or entering into the photometry routine, shown in FIG. 25, when power ON, step e5; determining whether the rewinding switch turns ON or OFF when determining that the self-timer switch turns ON during the self-timer mode, step e6; performing the rewinding action when determining that the rewinding switch turns ON in step e5, and determining whether or not the rewinding action is normally completed, and performing error jobs when the rewinding action is failed, step e7; determining either power ON or OFF when determining that the rewinding action is normally completed, and entering into the main ON-sleep routine, shown in FIG. 26, when power ON or entering into the sleep routine when power OFF.

The real-exposure sub-routine of the camera further comprises the following steps of: step e8; supplying electronic-current to the shutter coil when determining that the rewinding switch turns OFF or when not in step e1, step e9; waiting 10 ms of the waiting time, step e10; driving the shutter after the waiting time, step e11; determining whether or not the shutter driving results in error, and performing error jobs when determining that the shutter driving results in error, step e12; determining whether or not continuous shooting mode is activated when not in step e11, step e13; performing the shutter charging operation when not in step e12, and then, determining whether or not the shutter charging operation is normally completed and performing error jobs when the shutter charging operation is failed, step e14; performing the one-frame-film feeding operation, and then, determining whether or not the one-frame-film feeding operation is normally completed and performing error jobs when the one-frame-film feeding operation is failed, step e15; determining whether or not the film tension of the final frame is detected, and entering step e20 when determining that the film tension of the final frame is detected, and step e16; waiting until switch S2 turns OFF and the cable release is deactivated when not in step e15, and entering into the photometry sub-routine shown in FIG. 25.

The real-exposure sub-routine of the camera further comprises the following steps of: step e17; performing the shutter charging operation and the film feeding operation simultaneously when determining that continuous shooting mode is activated in step e12, step e18; determining whether or not the shutter charging operation results in error and performing error jobs when determining that the shutter charging operation results in error, step e19; determining whether or not the film tension of the final frame is detected when not in step e18, step e20; performing the rewinding operation when determining that the film tension of the final frame is detected in step e19, and then, determining whether or not the rewinding operation is normally completed and performing error jobs when the rewinding operation is failed, step e21; determining either power ON or OFF when determining that the rewinding operation is normally completed, and entering into the main ON-sleep routine shown in FIG. 26 when power ON or entering into the sleep routine when power OFF, step e22; determining whether or not the film feeding operation results in error when not in step e19, and performing error jobs when determining that the film feeding operation results in error, step e23; determining whether or not the automatic loading condition is fulfilled when not in step e22, step e24; changing the value of the counter to [1] and entering step e16 when determining that the automatic loading condition is fulfilled in step e23, step e25; determining whether or not the value of the counter is [0] when not in step e23, step e26; adding [1] to the value of the counter when not in step e25, step e27; determining whether or not switch S2 turns ON in the continuous shooting mode or whether or not the cable release is activated, and entering step e16 when not, step e28; determining whether or not the AE shooting mode is selected when determining that switch S2 turns ON or the cable release is activated in step e27, and step e29; performing the photometry and re-calculation of the shutter speed when determining that the AE shooting mode is selected in step e28 and returning to step e8.

Figure 28:
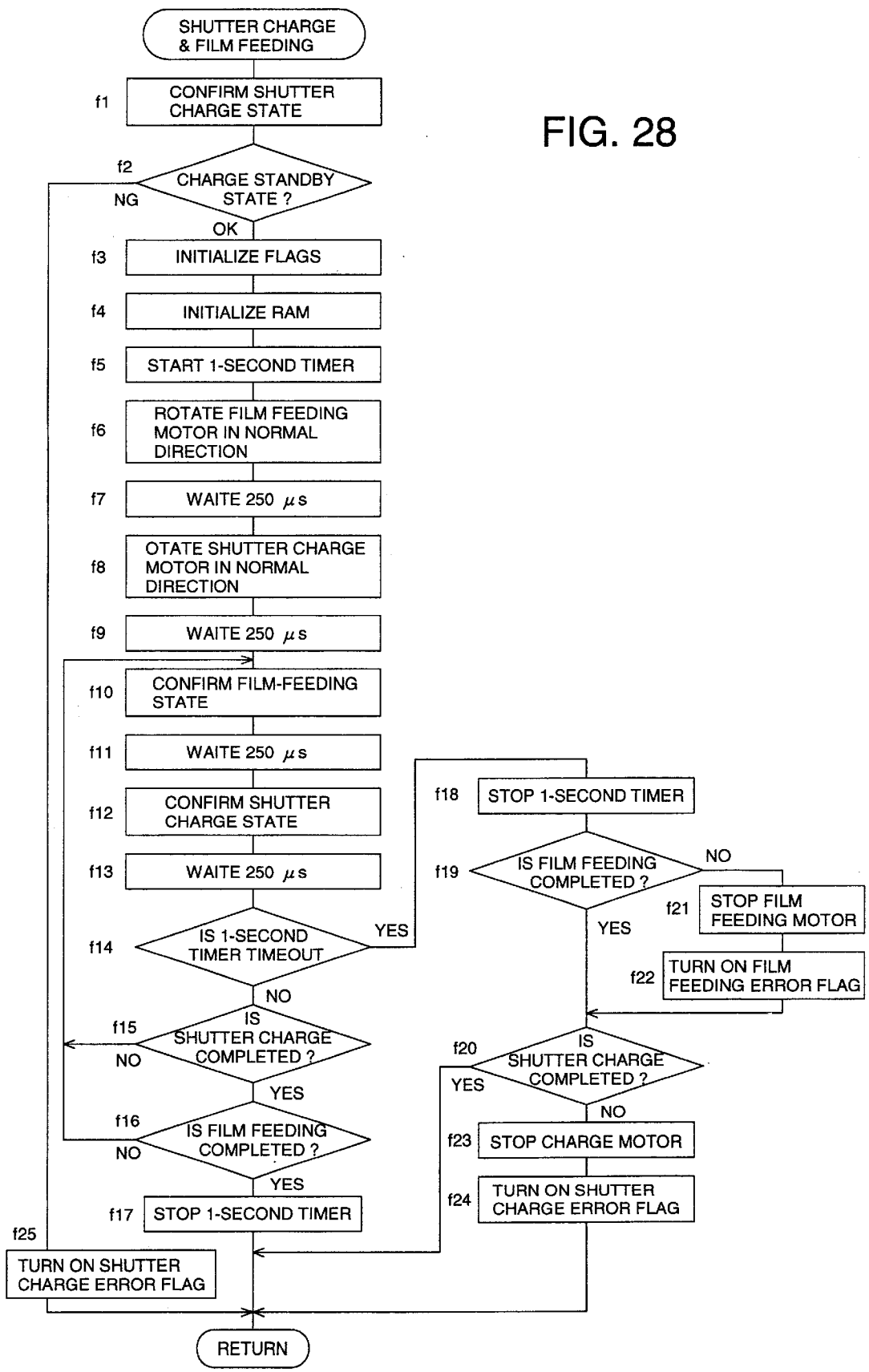
FIG. 28 shows a flowchart of a shutter charging and film feeding sub-routine.

FIG. 28 shows a flowchart of the shutter charging and film feeding sub-routine performed in step e17 shown in FIG. 27.

The shutter charging and film feeding sub-routine of the camera comprises the following steps of: step f1; confirming a shutter charging state by checking detecting board 157 stuck on detecting gear 156 by means of shutter charge reflector 158, step f2; determining whether or not charging lever 150 is positioned at a charge standby state, step f25; turning the charge error flag to ON when not in step f2, and exiting this sub-routine to return to the real-exposure sub-routine, step f3; initializing the flag for film-feeding when determining that charging lever 150 is positioned at a charge standby state in step f2, step f4; initializing the RAM, step f5; starting the 1 second timer, step f6; rotating film feeding motor 60 in normal direction, step f7; waiting 250 µs, step f8; rotating shutter charging motor 51 in normal direction, step f9; waiting 250 µs, and step f10; confirming a film-feeding state. In the abovementioned flow, the starting time of film feeding motor 60 and that of shutter charging motor 51 are shifted 250 µs each other, in order to confirm the film-feeding state and the shutter charging state at an interval every 1 ms.

The shutter charging and film feeding sub-routine of the camera further comprises the following steps of: step f11; further waiting 250 µs, step f12; confirming a shutter charging state, step f13; waiting 250 µs, and step f14; determining whether or not the 1-second timer reaches to the timeout state.

In the above flowchart, both the confirming process of the shutter charging state and that of film feeding state are configured in the sub-routines, both of which finalize the processing within 250 µs. Therefore, the checking action for the shutter charging state and that for film feeding state is performed at an interval every 1 ms including waiting time of 250 µs inserted between two sub-routines mentioned above.

In both the confirming process of the shutter charging state and that of film feeding state, CPU 200 detects a present status of each process to perform a suitable processing corresponding to the detected status. Accordingly, CPU 200 sets a finalization flag when detecting completion of the film feeding or completion of the shutter charging at a certain time during repeatedly running through both sub-routines.

The shutter charging and film feeding sub-routine of the camera further comprises the following steps of: step f14; determining whether or not the 1-second timer reaches to the timeout state after detecting completion of the film feeding operation and completion of the shutter charging operation, step f15; determining whether or not the shutter charging operation is completed when not in step f14, and returning to step f10 when determining that the shutter charging operation is not completed, step f16; determining whether or not the film feeding operation is completed when determining that the shutter charging operation is completed in step f15, step f17; stopping the 1-second timer when determining that the film feeding operation is completed in step f16, and exiting this sub-routine to return-to the real-exposure sub-routine.

For instance, when the film feeding operation is not completed in step f16, CPU 200 does not enter the shutter driving mode (shutter charge standby state), even if the shutter charging operation is completed in step f15. When both the film feeding operation and the shutter charging operation are completed within the predetermined time interval, CPU 200 stops the 1-second timer and exits the shutter charging and film feeding sub-routine to return to the real-exposure sub-routine.

Returning to the real-exposure sub-routine, the continuous shooting mode will be repeated, when the release button is still depressed to turn switch S2 ON.

The shutter charging and film feeding sub-routine of the camera further comprises the following steps of: step f18; stopping the 1-second timer when determining that the 1-second timer reaches to the timeout state in step f14, step f19; determining whether or not the film feeding operation is completed, step f20; determining whether or not the shutter charging operation is completed, when determining that the film feeding operation is completed in step f19, and exiting this sub-routine to return to the real-exposure sub-routine when determining that the shutter charging operation is completed, step f21; stopping the film feeding motor 60 when not in step f19, step f22; turning the film feeding error flag to ON, and entering step f20, step f23; stopping shutter charging motor 51 when not in step f20, and step f24; turning the shutter charging error flag to ON, and exiting this sub-routine to return to the real-exposure sub-routine.

Figure 29:
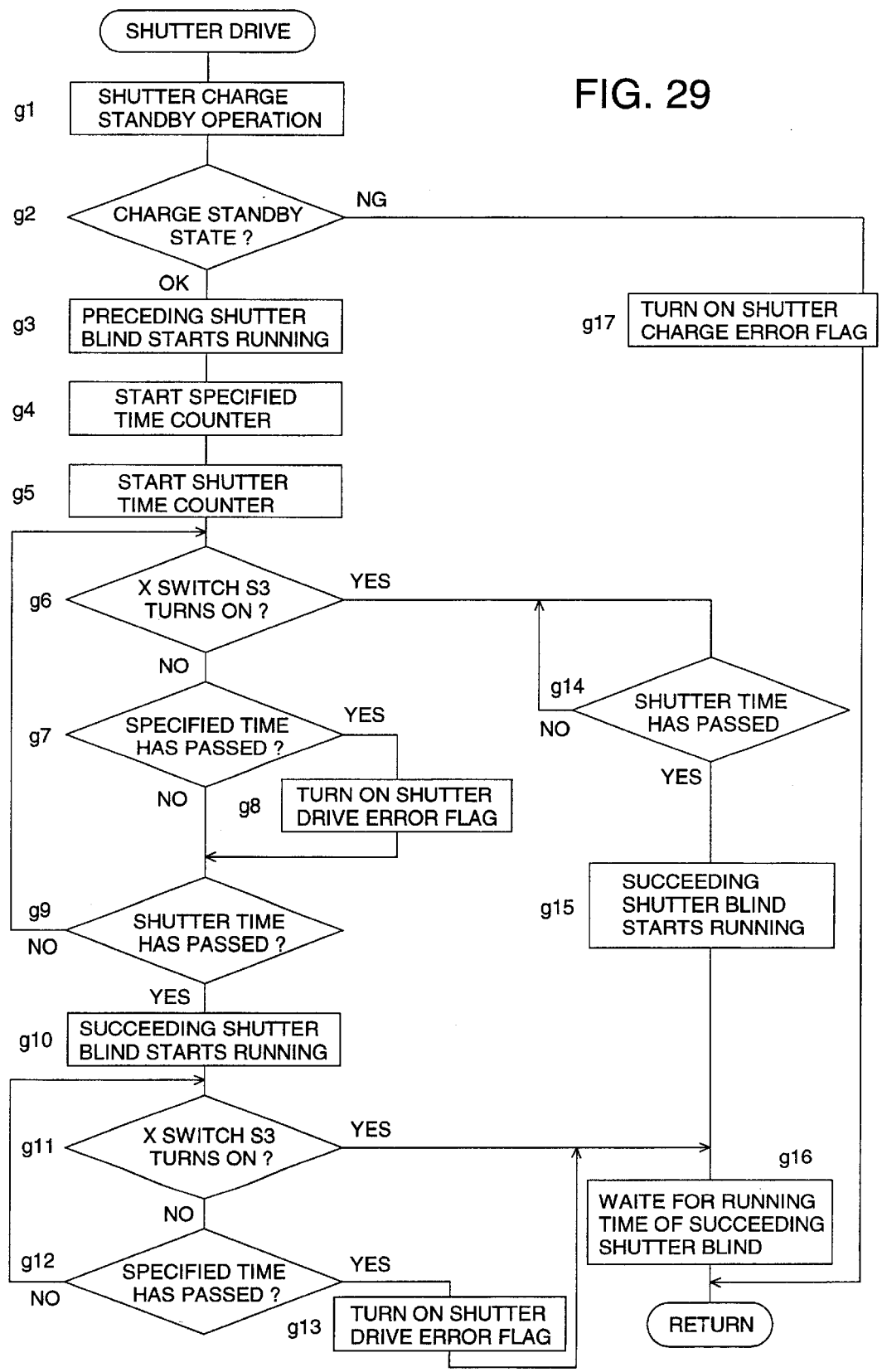
FIG. 29 shows a flowchart of a shutter drive sub-routine.
Figure 30:
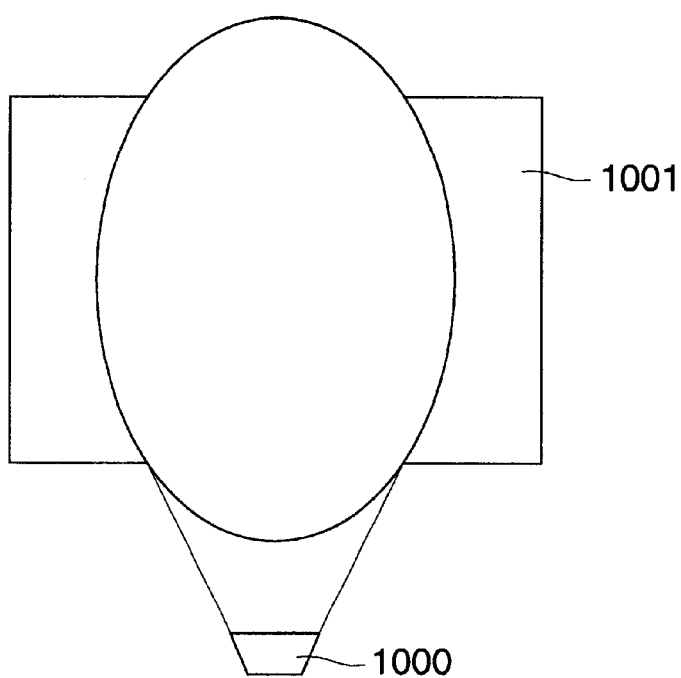
FIG. 30(*a*) and FIG. 30(*b*) show an explanatory illustration of a photometry region in conventional cameras.
Figure 30:
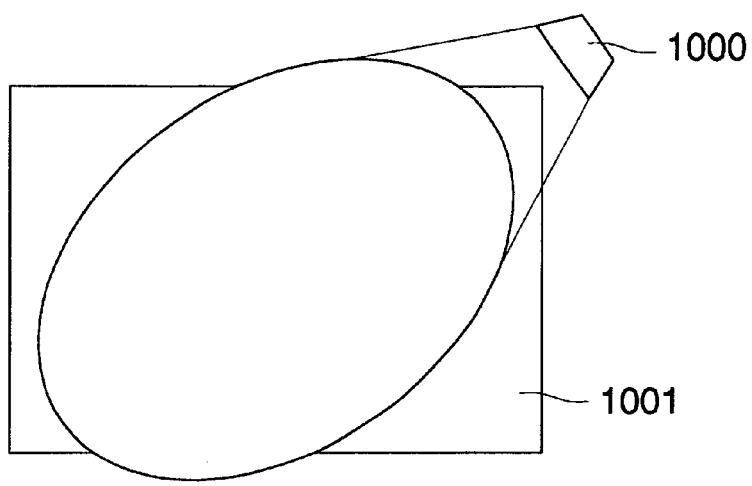

FIG. 29 shows a flowchart of the shutter drive sub-routine performed in step e10 shown in FIG. 27.

The shutter drive sub-routine of the camera comprises the following steps of: step g1; performing the shutter charge standby operation by rotating shutter charging motor 51 in normal direction, thereby, the preceding shutter blind and the succeeding shutter blind are electrically held, instead of the previous mechanical holding state, step g2; determining whether or not the shutter charge standby operation is completed, step g17; turning the shutter charge error flag to ON when not in step g2, and exiting this sub-routine to return to the real-exposure sub-routine, step g3; allowing the preceding shutter blind to run by deactivating electro-magnet 138 serving for the preceding shutter blind when determining that the shutter charge standby operation is completed in step g2, step g4; starting the specified time counter, step g5; starting the shutter time counter which measures a shutter time corresponding to the real-exposure time, step g6; determining whether or not X switch S3 turns ON, step g14; activating the trigger of the strobe and the date section (not shown in drawing) when determining that X switch S3 turns ON in step g6, and then, determining whether or not the shutter time has passed, step g15; allowing the succeeding shutter blind to run by deactivating electro-magnet 139 serving for the succeeding shutter blind when determining that the shutter time has passed in step g15, step g16; waiting until the running time of the succeeding shutter blind has elapsed, and then, returning to the real-exposure sub-routine, step g7; determining whether or not the specified time has passed when not in step g6, step g8; turning the shutter drive error flag to ON when determining that the specified time has passed in step g7, step g9; determining whether or not the shutter time has passed when not in step g7, and returning to step g6 when determining that the shutter time has not passed, and step g10; allowing the succeeding shutter blind to run when determining that the shutter time has passed in step g9.

As mentioned above, when the specified time has elapsed until X switch S3 turns ON, CPU 200 determines that the preceding shutter blind did not open within the specified time interval and turns the shutter drive error flag to ON.

The shutter drive sub-routine of the camera further comprises the following steps of: step g10; allowing the preceding shutter blind to run, step g11; determining whether or not X switch S3 turns ON, and entering step g16 after activating the trigger of the strobe and the date section (not shown in drawing) when determining that X switch S3 turns ON, step g12; determining whether or not the specified time has passed when not in step g11, and step g13; returning to step g11 when not in step g12, or turning the shutter drive error flag to ON and entering step g16 when determining that the specified time-has passed in step g12.

As mentioned above, when the exposure time is shorter than the specified time, CPU 200 allows the preceding shutter blind to run, and checks the ON status of X switch S3 and the elapse of the specified time. Then, when the specified time has elapsed again until X switch S3 turns ON even at this time, CPU 200 turns the shutter drive error flag to ON. After the succeeding shutter blind starts running, the shutter drive sub-routine is finalized when a sufficient time has passed to complete the running operation of the succeeding shutter blind.

According to the present invention, it becomes possible to improve the efficiency of the photometry, since the longer direction of the photometric region coincides with that of the image window by arranging the photometry means at substantially the center side position of the shorter-axis of the image window, viewing from the shooting lens side.

Further, according to the present invention, it becomes possible for a photographer to select the suitable photometric region corresponding to the scene to be shot, since the variable photometry can be achieved by varying the photometric region in an optical path, through which the light reflected by the focal-plane shutter incidents on (enters into) the photometry means.

Further, according to the present invention, it becomes possible for the photographer to easily select the desirable photometric region, since the photometric region is displayed on the photometric region display, which is equipped in the finder to display the photometric region set by the photometry aperture.

Further, according to the present invention, since the photometry means is integrally assembled with the focal-plane shutter unit, so as to adjust the relative position between the focal-plane shutter and the photometry means before assembling the unit in the camera body, it becomes possible to detect failed units and to precisely assemble the units.

Further, according to the present invention, since the dating means is integrally assembled with the focal-plane shutter unit, so as to adjust the relative position between the focal-plane shutter and the dating means in a state of unit, the readjustment of the relative position between them is not necessarily when performing maintenance works.

Furthermore, according to the present invention, since the X switch turns ON only when the succeeding blind completely running through the aperture, it is possible to detect an error state caused by a certain malfunction, when the X switch does not turns ON within the predetermined time after the succeeding blind starts running. Thus, the photographer can easily perceive the error state of the camera with the liquid-crystal display and/or the warning sound activated when the shooting becomes impossible.

What is claimed is:

1. A camera, comprising:

a lens;

an image window having an aperture to bound a light coming through said lens in a plane perpendicular to an optical axis of said lens;

a focal-plane shutter; and a photometry sensor to receive said light reflected by said focal-plane shutter and detect an amount of said light reflected by said focal-plane shutter after coming through said lens, wherein said photometry sensor is located at an outside of said aperture and resides on a plane, which is parallel with said optical axis and includes a line which is parallel to a long-axis of said aperture and passes substantially a center of a short-axis of said aperture.

2. The camera of claim 1, wherein said photometry sensor is located outside a light path through which said light, entering from said lens, travels to said aperture.

3. The camera of claim 1, further comprising:

a photometry aperture control to set a photometry range, said photometry aperture control is disposed in an optical path through which said light, reflected by said focal-plane shutter, travels to said photometry sensor.

4. The camera of claim 3, further comprising:

a finder; and a photometry range display, disposed in said finder, to display said photometry range set by said photometry aperture control.

5. The camera of claim 1, further comprising:

a processor to obtain parameters in regard to an exposure control, based on an amount of said light detected by said photometry sensor.

6. The camera of claim 1, wherein said photometry sensor is integrally arranged in a shutter unit which comprises said focal-plane shutter.

7. The camera of claim 1, further comprising:

a date projector to project a date on a film loaded in said camera, said date projector is integrally arranged in a shutter unit which comprises said focal-plane shutter.

8. The camera of claim 1, further comprising:

a X-switch signal sensor to detect a signal of a X-switch mounted in said focal-plane shutter; and a controller to perform error jobs, when said X-switch signal sensor does not detect said signal within a predetermined time after activating a shutter release button.

9. A camera, comprising:

a lens;

a shutter unit comprising a focal-plane shutter; and a photometry sensor to receive and detect an amount of a light reflected by said focal-plane shutter after coming through said lens, said photometry sensor is integrally arranged in said shutter unit.

10. A camera, comprising:

a lens;

a shutter unit comprising a focal-plane shutter; and a date projector to project a date on a film loaded in said camera, said date projector is integrally arranged in said shutter unit.

11. A camera, comprising:

a lens;

a focal-plane shutter;

a X-switch signal sensor to detect a signal of a X-switch; and a controller to perform error jobs, when said X-switch signal sensor does not detect said signal within a predetermined time after activating a shutter release button.

12. A camera, comprising:

a photographic lens;

an aperture to bound a light coming through said photographic lens in a plain perpendicular to an optical axis of said lens;

a focal-plane shutter; and a photometry means, wherein said camera performs a photometry by means of said photometry means which receives said light coming through said photographic lens and reflected from said focal-plane shutter, and said photometry means is arranged at substantially a center side position of a short-axis of said aperture, viewing from said photographic lens side.

\* \* \* \* \*